United States Patent
Rotole et al.

(10) Patent No.: US 10,806,078 B2
(45) Date of Patent: Oct. 20, 2020

(54) CONTROL SYSTEM FOR ADJUSTING CONDITIONING ROLLERS OF WORK VEHICLE

(71) Applicant: Deere & Company, Moline, IL (US)

(72) Inventors: David V. Rotole, Bloomfield, IA (US);
Ethan C. Conrad, Ottumwa, IA (US);
Mitchell R. Usasz, Ottumwa, IA (US);
Kellen B. Hill, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 220 days.

(21) Appl. No.: 15/937,526

(22) Filed: Mar. 27, 2018

(65) Prior Publication Data
US 2018/0325031 A1 Nov. 15, 2018

Related U.S. Application Data

(60) Provisional application No. 62/505,655, filed on May 12, 2017.

(51) Int. Cl.
*A01D 43/10* (2006.01)
*A01D 41/127* (2006.01)
(Continued)

(52) U.S. Cl.
CPC ......... *A01D 43/102* (2013.01); *A01D 41/127* (2013.01); *A01D 34/66* (2013.01);
(Continued)

(58) Field of Classification Search
CPC .. A01D 43/085; A01D 41/127; A01D 43/102; A01D 41/1243; A01D 34/66; A01D 61/008; A01D 82/02
See application file for complete search history.

(56) References Cited

U.S. PATENT DOCUMENTS

| 4,858,419 A | 8/1989 | Bernier |
| 5,930,988 A | 8/1999 | Hanson |

(Continued)

FOREIGN PATENT DOCUMENTS

| DE | 19539143 A1 | 4/1997 |
| DE | 19826976 A1 | 12/1999 |

(Continued)

OTHER PUBLICATIONS

German Search Report for application No. 18171609.3 dated Sep. 12, 2018.

(Continued)

*Primary Examiner* — Nga X Nguyen

(74) *Attorney, Agent, or Firm* — Klintworth & Rozenblat IP LLP

(57) ABSTRACT

A harvesting work vehicle includes a conditioning arrangement configured to condition a crop material. A method of operating the work vehicle includes receiving, by a processor of a control system from a memory element, a stored conditioning setting for a variable parameter of the conditioning arrangement. The method also includes processing, by the processor, a conditioning control signal based, at least in part, on the stored conditioning setting. Furthermore, the method includes changing, with an actuator, the variable parameter of the conditioning arrangement according to the conditioning control signal.

17 Claims, 10 Drawing Sheets

(51) Int. Cl.
*A01D 82/02* (2006.01)
*A01D 41/12* (2006.01)
*A01D 34/66* (2006.01)
*A01D 61/00* (2006.01)

(52) U.S. Cl.
CPC ........ *A01D 41/1243* (2013.01); *A01D 61/008* (2013.01); *A01D 82/02* (2013.01)

(56) References Cited

U.S. PATENT DOCUMENTS

| | | | |
|---|---|---|---|
| 5,995,895 | A | 11/1999 | Watt et al. |
| 6,070,673 | A | 6/2000 | Wendte |
| 6,128,574 | A | 10/2000 | Diekhans |
| 6,421,994 | B1 | 7/2002 | Boucher et al. |
| 6,425,232 | B1 | 7/2002 | Desnijder et al. |
| 6,955,034 | B1 | 10/2005 | Blakeslee et al. |
| 9,668,418 | B2 | 6/2017 | Patton et al. |
| 9,668,420 | B2 | 6/2017 | Anderson et al. |
| 2003/0079456 | A1 | 5/2003 | Mellin |
| 2003/0188521 | A1 | 10/2003 | Muller et al. |
| 2004/0221562 | A1 | 11/2004 | Snider |
| 2005/0097874 | A1 | 5/2005 | Priepke |
| 2005/0126147 | A1 | 6/2005 | Nickel et al. |
| 2006/0123764 | A1 | 6/2006 | McLean et al. |
| 2006/0189362 | A1 | 8/2006 | Niermann et al. |
| 2006/0277888 | A1 | 12/2006 | Erdmann et al. |
| 2009/0005990 | A1 | 1/2009 | Anderson et al. |
| 2009/0223192 | A1 | 9/2009 | Engel |
| 2009/0312920 | A1* | 12/2009 | Boenig ............... A01D 41/127 701/50 |
| 2010/0217474 | A1 | 8/2010 | Baumgarten et al. |
| 2010/0242427 | A1* | 9/2010 | Anstey ............... A01D 89/008 56/341 |
| 2012/0185140 | A1 | 7/2012 | Kormann et al. |
| 2013/0086879 | A1 | 4/2013 | Laumeier |
| 2014/0083071 | A1 | 3/2014 | Fay, II |
| 2014/0096498 | A1 | 4/2014 | Estock et al. |
| 2014/0215984 | A1 | 8/2014 | Bischoff |
| 2014/0237981 | A1 | 8/2014 | Roberge |
| 2014/0302897 | A1 | 10/2014 | Isaac et al. |
| 2015/0253427 | A1 | 9/2015 | Slichter et al. |
| 2016/0066509 | A1 | 3/2016 | Fay, II et al. |
| 2017/0071132 | A1 | 3/2017 | Dunn et al. |
| 2017/0265390 | A1 | 9/2017 | Panoushek et al. |
| 2017/0280627 | A1 | 10/2017 | Treffer et al. |
| 2018/0035609 | A1* | 2/2018 | Barbi ............... G06T 7/001 |
| 2018/0243771 | A1 | 8/2018 | Davis et al. |
| 2018/0257657 | A1 | 9/2018 | Blank et al. |
| 2018/0271016 | A1 | 9/2018 | Milano et al. |
| 2018/0317388 | A1 | 11/2018 | Gresch et al. |
| 2018/0325024 | A1 | 11/2018 | Rotole et al. |
| 2018/0325028 | A1 | 11/2018 | Rotole et al. |
| 2018/0325029 | A1 | 11/2018 | Rotole et al. |
| 2018/0325032 | A1 | 11/2018 | Rotole et al. |
| 2018/0329618 | A1 | 11/2018 | Wieckhorst et al. |
| 2018/0329620 | A1 | 11/2018 | Cabrespine et al. |

FOREIGN PATENT DOCUMENTS

| | | |
|---|---|---|
| DE | 10030505 A1 | 1/2002 |
| DE | 102013110636 A1 | 3/2015 |
| DK | 135799 B | 6/1977 |
| EP | 0558436 A1 | 1/1993 |
| EP | 2436259 A1 | 4/2012 |
| EP | 2710875 A1 | 3/2014 |
| EP | 2853146 A2 | 7/2014 |
| EP | 2853143 A1 | 4/2015 |
| NL | 1026257 C1 | 11/2005 |
| RU | 99922 U1 | 7/2010 |
| WO | 2015148902 A1 | 10/2015 |

OTHER PUBLICATIONS

Glancey et al., A System for the Automatic Adjustment and Control of the Conditioning Roll Gap on Mower-Conditioners, SAE Technical Paper 2004-01-2732, https://doi.org/10.4271/2004-01-2732, Oct. 26, 2004.

USPTO Office Action issued in pending U.S. Appl. No. 15/937,620 dated Apr. 23, 2020.

Massey Ferguson, Product Information Guide, Hay Tools Kits Guide, MF16-57PMB, May 2017, 112 pages (specific to pp. 30-34 for 9100 Series RazorBar Disc Headers).

German Search Report for application No. 18171600.2 dated Sep. 12, 2018, 6 pages.

German Search Report for application No. 18171208.4 dated Sep. 12, 2018, 6 pages.

German Search Report for application No. 18171218.3 dated Sep. 12, 2018, 7 pages.

USPTO Office Action issued in pending U.S. Appl. No. 15/937,651 dated Sep. 5, 2019.

USPTO Office Action issued in pending Utility U.S. Appl. No. 15/937,673 dated Jul. 1, 2020.

* cited by examiner

CONTROL SYSTEM FOR ADJUSTING CONDITIONING ROLLERS OF WORK VEHICLE

CROSS-REFERENCE TO RELATED APPLICATION(S)

The following claims priority to U.S. Provisional Patent Application No. 62/505,655, filed on May 12, 2017, the disclosure of which is incorporated herein by reference in its entirety.

STATEMENT OF FEDERALLY SPONSORED RESEARCH OR DEVELOPMENT

Not applicable.

FIELD OF THE DISCLOSURE

This disclosure relates to the control of work vehicles configured for processing material and, more particularly, to control systems and methods for operating a work vehicle for conditioning crop material, windrowing crop material, and/or measuring crop yield using components of the work vehicle.

BACKGROUND OF THE DISCLOSURE

Crop materials are often cut, conditioned, arranged into windrows, and/or otherwise processed. In some cases, the crop materials may be raked, chopped, and/or baled as well. Certain work vehicles are provided for these activities.

Some harvesting work vehicles, such as conditioning work vehicles and/or windrowing work vehicles, may include implements for cutting, conditioning, and/or arranging the crop material into a windrow as the work vehicle moves across a field. In some cases, the configuration of these implements may be changed. For example, the position of the implements on the work vehicle may be selectively changed. These components are manually adjustable in most cases.

SUMMARY OF THE DISCLOSURE

This disclosure provides a harvesting work vehicle with an automatically configurable, programmable, and/or moveable conditioning arrangement. This disclosure also provides a control system for selectively controlling the configuration of the conditioning arrangement and methods for operating the same.

In one aspect, a method of operating a conditioning arrangement for a harvesting work vehicle is disclosed. The conditioning arrangement includes a conditioning roller and an opposing member that are configured to cooperatively condition a crop material that passes through a gap between the conditioning roller and the opposing member. The method includes receiving, by a processor of a control system from a memory element, a stored conditioning setting for the conditioning roller. The method also includes processing, by the processor, a conditioning control signal based, at least in part, on the stored conditioning setting. Furthermore, the method includes changing, with an actuator, a variable parameter of the conditioning roller according to the conditioning control signal.

In another aspect, a harvesting work vehicle is disclosed that includes a conditioning arrangement configured to condition a crop material. The conditioning arrangement includes a conditioning roller and an opposing member that are configured to cooperatively condition a crop material that passes through a gap between the conditioning roller and the opposing member. The work vehicle also includes a control system with a processor and a memory element. The work vehicle further includes an actuator configured to actuate to change a variable parameter of the conditioning roller. The processor is configured to receive, from the memory element, a stored conditioning setting for the variable parameter of the conditioning arrangement. The processor is configured to process a conditioning control signal based, at least in part, on the stored conditioning setting. Additionally, the actuator is configured to actuate to change the variable parameter according to the conditioning control signal.

In still another aspect, a method of operating a harvesting work vehicle with a conditioning arrangement is disclosed. The conditioning arrangement includes a first conditioning roller and a second conditioning roller that are separated by a gap. The first conditioning roller is supported for movement relative to the second conditioning roller between a neutral position and a displaced position. The conditioning arrangement is configured to receive a crop material within the gap to be conditioned between the first and second conditioning rollers. The conditioning arrangement includes a biasing member that biases the first conditioning roller toward the neutral position. The method includes performing a first harvesting operation in a field with the harvesting work vehicle. Performing the first harvesting operation includes detecting, with at least one conditioning sensor, an actual gap setting corresponding to a dimension of the gap at the neutral position. Performing the first harvesting operation also includes detecting, with the at least one conditioning sensor, an actual bias setting corresponding to an amount of biasing force provided by the biasing member. Moreover, the first harvesting operation includes detecting, with a location sensor, a location within the field at which the conditioning arrangement is set at the actual gap setting and the actual bias setting. Additionally, the first harvesting operation includes saving, within a memory element, the actual gap setting and the actual bias setting as a stored conditioning setting that is associated with the location. The method further includes performing a second harvesting operation in the field with the harvesting work vehicle. Performing the second harvesting operation includes determining that the second harvesting operation includes return travel to the location. The second harvesting operation also includes receiving, by a processor from the memory element, the stored conditioning setting associated with the location. Furthermore, the second harvesting operation includes processing, by the processor, a conditioning control signal based on the stored conditioning setting. Moreover, the second harvesting operation includes changing, with a first actuator, the dimension of the gap at the neutral position according to the stored conditioning setting. Also, the second harvesting operation includes changing, with a second actuator, the amount of biasing force according to the stored conditioning setting.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
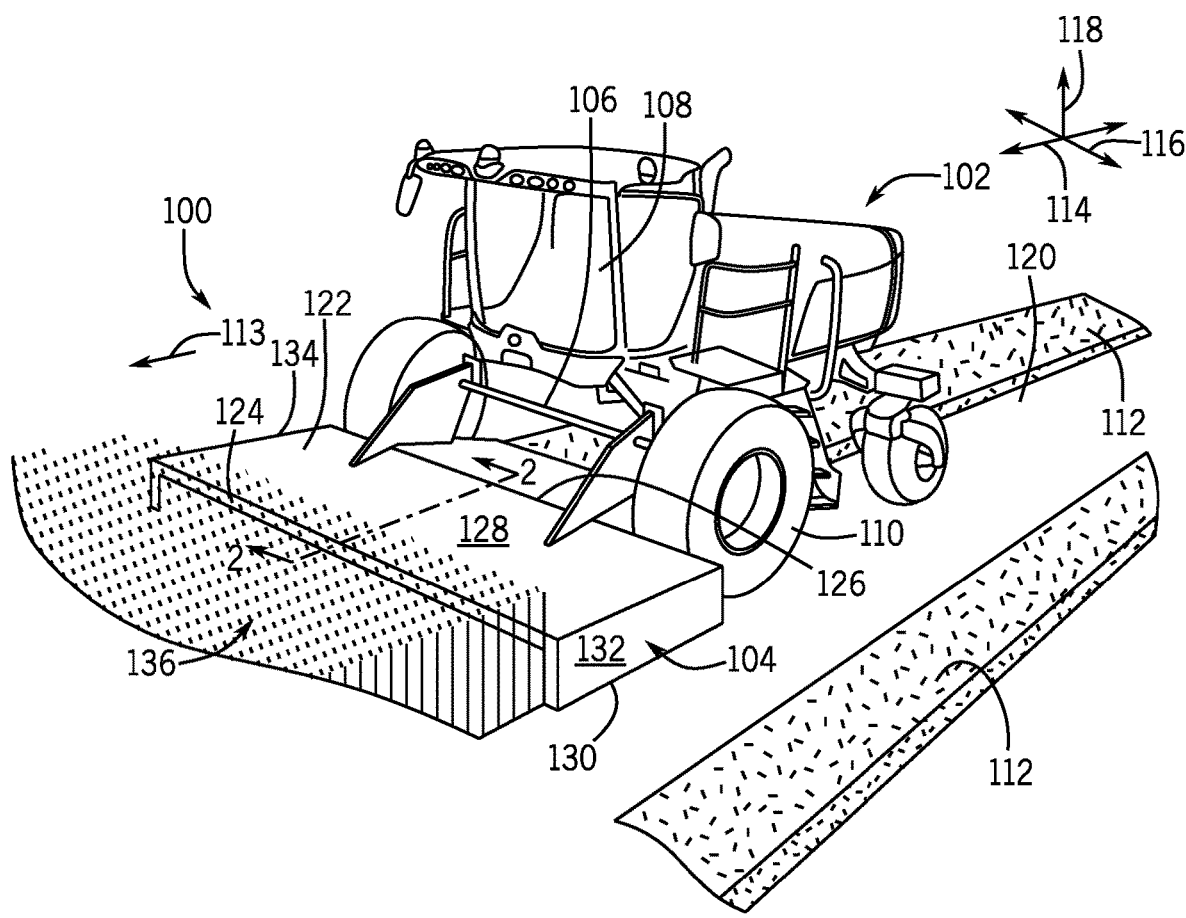
FIG. 1 is an isometric view of a work vehicle according to example embodiments of the present disclosure.

The following describes one or more example embodiments of the disclosed work vehicle having conditioning and/or windrowing arrangements, and their methods of use as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes example embodiments of systems and methods for controlling configurable (e.g., moveable) arrangements of a work vehicle (e.g., a windrower, a swather, a forest harvester, a hay-and-forage vehicle, and/or a mower conditioner). In some embodiments, the system of the present disclosure may be used to control settings and/or movements of a windrowing arrangement that shapes, positions, arranges, or otherwise controls production of a windrow of crop material. The system may also be configured to control settings and/or movements of a conditioning arrangement that conditions the crop material (e.g., by crimping, crushing, or otherwise breaking down stems, etc. of the agricultural material).

The disclosed control system may be used to generate control signals for re-configuring, re-setting, and/or re-positioning a component with respect to support structure on which it is mounted. Moreover, the disclosed control system may be used for generating such control signals for a plurality of windrowing and/or conditioning arrangements that are mounted on a windrower. Furthermore, the control systems and methods of operation may be employed for controlling windrowing and/or conditioning arrangements among a fleet of work vehicles. As such, the positioning of the windrowing/conditioning arrangements may be coordinated and the arrangements may be positioned relative to each other in a controlled and coordinated manner.

In some embodiments, one or more features of the present disclosure may be configured for detecting the actual and current setting of a conditioning or windrowing arrangement. The position of a component relative to its support structure may be detected. For example, an actuator may move the component from a first position to a second position relative to its support structure, and a sensor may ultimately detect the second position of the component. The sensor may send position data that corresponds to the detected position to a processor of the control system. The position data may be stored in a memory element. This stored position data may be accessed by the processor to, in the above example, return the component to the second position upon command. More specifically, in some embodiments, the processor may access and receive the stored position data, process a positioning control signal based on the stored position data, and move the component to the second position according to the positioning control signal.

Accordingly, as will be discussed, the systems and methods of the present disclosure may provide automatic and programmable movements of the work vehicle components. These controlled movements may also be repeatable. Also, these systems and methods may also be used to gather and learn valuable information about how the work vehicle operates under certain conditions. The system may detect and record the position of the components, and this data may be associated with other data (e.g., location of the work vehicle within the field, geolocation, crop type, time of season, weather conditions, etc.) to thereby generate an informative record of the crop material processing operation. This information may be used, for example, to generate a program such that position of the components may be controlled automatically as the windrowing apparatus moves through the field. Accordingly, the amount of harvested material may be increased.

Moreover, in some embodiments, the systems and methods of the present disclosure may be used to determine characteristics of the crop material as the work vehicle operates. For example, the systems and methods may be used to detect locations within the field that are particularly dense with crop material as compared to other locations within the field. The work vehicle components may be positioned according to this detected information to affect windrowing operations. Also, these locations may be recorded in memory for future use. Also, in some embodiments, yield of the crop material may be determined using the systems and methods of the present disclosure.

In addition, the system may provide a user interface. Using the interface, the user may input a command to move a component to a predetermined position. In some embodiments, the system may detect the current settings of the conditioning arrangement and/or the windrowing arrangement. Then, with the user interface, the system may query the operator whether to reconfigure the arrangement(s) according to preset (predetermined) settings. Additionally, in some embodiments, the system may automatically reconfigure the arrangement(s) according to the preset (predetermined) settings.

Also, the systems and methods of the present disclosure may allow a work vehicle to be operated in an autonomous manner. This vehicle may be controlled by an onboard controller and/or controlled remotely by a control station for added convenience.

In some embodiments, the work vehicle and/or methods of operation of the present application may incorporate features disclosed in U.S. Nonprovisional patent application Ser. No. 15/894,373, filed Feb. 12, 2018, which claims priority to Provisional Patent Application No. 62/505,366, filed May 12, 2017, the entire disclosures of both being incorporated by reference. In some embodiments, the work vehicle and/or methods of operation of the present application may incorporate features disclosed in one or more U.S. patent applications claiming priority to U.S. Provisional Patent App. No. 62/597,236, filed Dec. 11, 2017, the disclosure of which is incorporated by reference in its entirety.

Processing crop material may be performed more efficiently using the systems and methods of the present disclosure. The movements of the components may be controlled, for example, according to the location of the work vehicle within the field, according to certain weather conditions, according to the crop type, or other input. As such, the system may be very useful and effective for completing conditioning and windrowing operations.

The term "position" will be used to describe the spacial orientation, posture, etc. of an arrangement relative to the support structure on which the implement is mounted. The term "position" will be used, for example, in relation to a conditioner roll, a swath flap, and a forming shield; however, it will be appreciated that the present disclosure applies to other arrangements without departing from the scope of the present disclosure. It will be appreciated that when an arrangement moves (linearly or angularly) relative to its support structure, the position of the arrangement is changed from a first position to a second position.

The term "location" will be used to describe the position (e.g., geolocation, geospatial location) of the work vehicle within a field of crop material. Thus, when the work vehicle moves across a field, the location of the work vehicle as well as the arrangement(s) mounted thereon changes from a first location to a second location.

Referring now to FIG. 1 a harvesting work vehicle, such as a windrower 100, is shown according to example embodiments of the present disclosure. In some embodiments, the windrower 100 may be may be a self-propelled machine. The concepts of the present disclosure are equally applicable to towed machines, or other configurations, as will be appreciated by those having skill in the art. Furthermore, although harvesting work vehicles that mow, condition and windrow crop materials are sometimes interchangeably referred to as mower-conditioners or windrowers, for the sake of simplicity, such machines will be referred to herein as "windrowers." Likewise, the teachings of the present application may apply to a forest harvester or other harvesting work vehicles.

Machines that both condition crop material and form a windrow from the same material will be discussed according to embodiments of the present disclosure; however, it will be appreciated that the present teachings may apply to machines that form windrows without necessarily conditioning the crop material. The present teachings may also apply to machines that condition (crimp, crush, etc.) crop material without necessarily forming a windrow. Furthermore, the systems and methods of the present disclosure may apply to harvesting of various types of crop materials, such as grasses, alfalfa, or otherwise. Accordingly, it will be appreciated that a wide variety of machines, systems, and methods may fall within the scope of the present disclosure.

In some embodiments, the windrower 100 broadly comprises a self-propelled tractor 102 and a header 104 (i.e., header attachment). The header 104 may be attached to the front of the tractor 102. The tractor 102 may include a chassis 106 and an operator compartment 108 supported atop the chassis 106. The operator compartment 108 may provide an enclosure for an operator and for mounting various user control devices (e.g., a steering wheel, accelerator and brake pedals, etc.), communication equipment and other instruments used in the operation of the windrower 100, including a user interface providing visual (or other)

user control devices and feedback. The tractor 102 may also include one or more wheels 110 or other traction elements for propelling the tractor 102 and the header 104 across a field or other terrain. The windrower 100 may form a windrow 112 as it moves along a travel direction indicated by the arrow 113.

The windrower 100 may define a coordinate system, such as a Cartesian coordinate system having a longitudinal axis 114, a lateral axis 116, and a vertical axis 118. The longitudinal axis 114 may be substantially parallel to the travel direction 113. The lateral axis 116 may be horizontal and normal to the longitudinal axis 114 to extend between opposing sides of the windrower 100. The vertical axis 118 may extend vertically and normal to the longitudinal axis 114, the lateral axis 116, and the ground 120.

The header 104 may generally include a frame 122, which is mounted to the chassis 106. The frame 122 may be mounted for movement relative to the chassis 106. For example, the frame 122 may move up and down, at least partly, along the vertical axis 118 relative to the chassis 106 and relative to crop material 136. In some embodiments, the frame 122 may tilt and rotate about an axis that is parallel to the lateral axis 116. Also, the frame 122 may comprise one or more support elements for supporting the implements (i.e., arrangement of implements, etc.) described below.

The frame 122 may generally include a front end 124 and a rear end 126. The rear end 126 may be spaced apart along the longitudinal axis 114 and may be attached to the chassis 106 of the tractor 102. The frame 122 may also include a top structure 128 and a lower area 130, which are spaced apart along the vertical axis 118. Furthermore, the frame 122 may include a first lateral side 132 and a second lateral side 134, which are spaced apart along the lateral axis 116.

In the embodiment shown and discussed below, the front end 124 is open to receive crop material 136 as the tractor 102 moves across the field. In some embodiments, the windrower 100 cuts the crop material 136, then conditions the crop material, and then shapes, places and/or arranges the crop material 136 into the windrow 112 as the tractor 102 moves.

Figure 2:
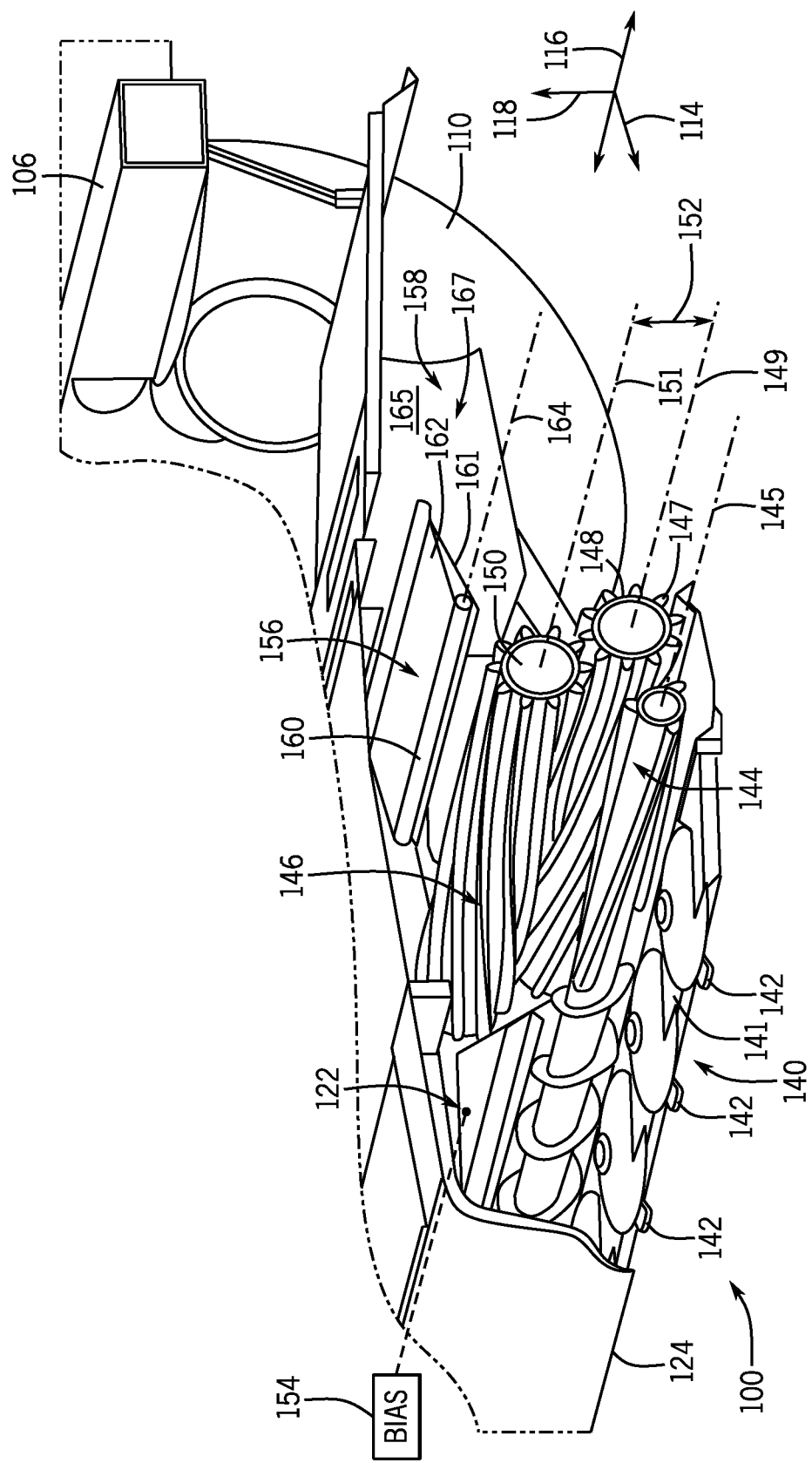
FIG. 2 is an isometric section view of the work vehicle taken along the line 2-2 of FIG. 1.
Figure 3:
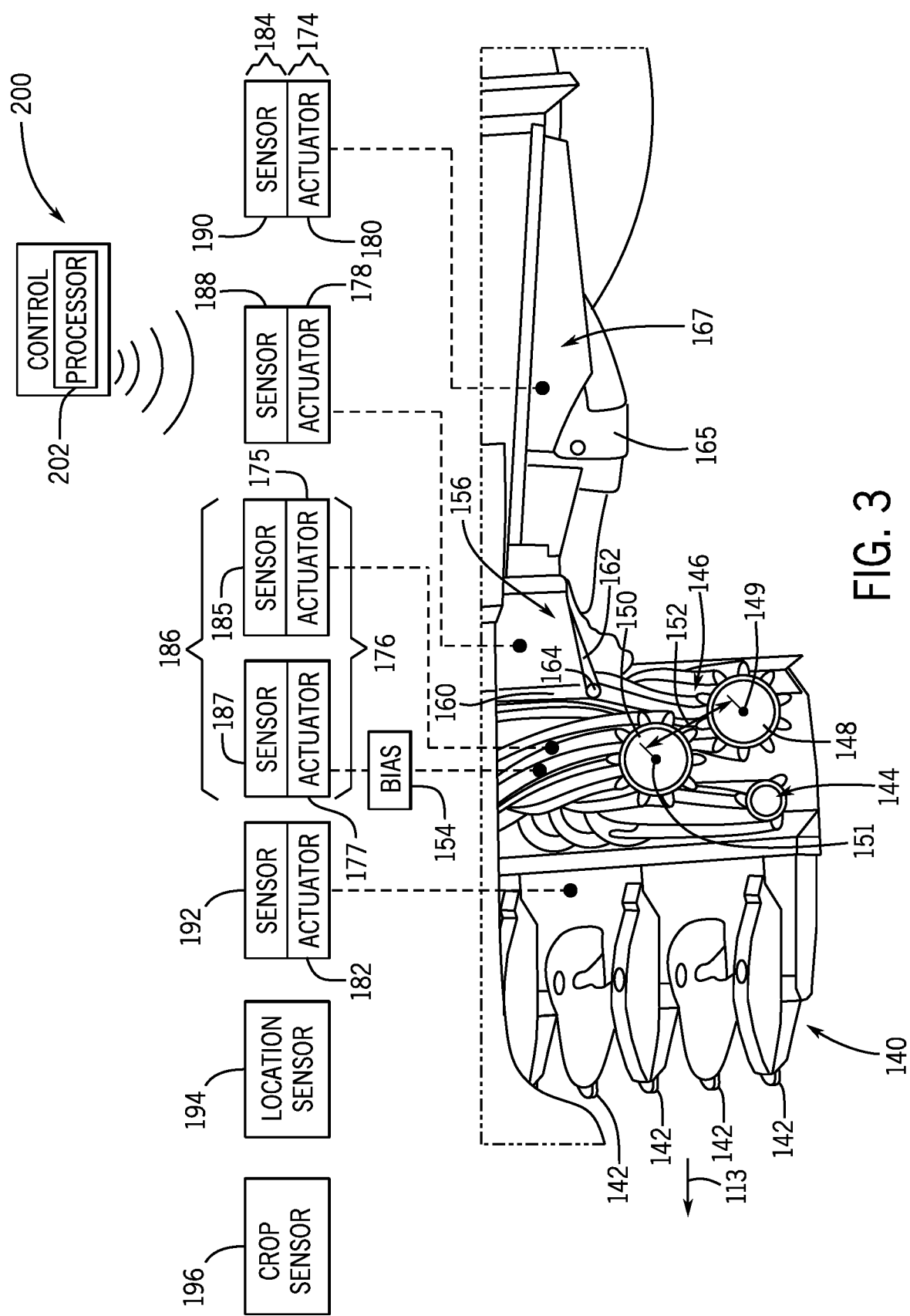
FIG. 3 is an isometric view of the work vehicle of FIG. 2 with some features shown schematically.

Referring now to FIGS. 2 and 3, the windrower 100 may include one or more arrangements (i.e., arrangements of various implements, tools, etc.), which may be supported by the frame 122 and/or supported by the chassis 106. For example, the windrower 100 may include a cutting arrangement 140 for severing standing crop material 136 as the windrower 100 moves through the field. In some embodiments, the cutting arrangement 140 may include one or more blades 142 that are supported by a support structure 141, proximate the front end 124 of the frame 122. The cutting arrangement 140 may include rotating blades as shown in FIGS. 2 and 3; however, the cutting arrangement 140 may include reciprocating sickle-like blades or other configurations without departing from the scope of the present disclosure.

The windrower 100 may further include a conveyor arrangement 144. The conveyor arrangement 144 may be an auger-like roller that is mounted for rotation about an axis 145. The axis 145 may be substantially parallel to the lateral axis 116 of the windrower 100. A support structure for the conveyor arrangement 144 is not shown specifically, but may be disposed proximate the first lateral side 132 and the second lateral side 134 of the frame 122 (FIG. 1). Once the crop material 136 has been cut by the cutting arrangement 140, the conveyor arrangement 144 may convey the crop material 136 rearward (generally along the longitudinal axis 114), away from the cutting arrangement 140 for further processing. It will be appreciated that the windrower 100 may include a different type of conveyor arrangement 144 without departing from the scope of the present disclosure. For example, the conveyor arrangement 144 may comprise a conveyor belt (e.g., a draper) in some embodiments.

Furthermore, the windrower 100 may additionally include at least one conditioning arrangement 146 (i.e., crop-conditioning implement, tool, etc.). In some embodiments, the conditioning arrangement 146 may comprise a conditioner roller and a member that opposes the conditioner roller, and crop material that passes between the roller and the opposing member are crimped, crushed, or otherwise conditioned by the pressure of the roller on the opposing member. In some embodiments represented in the Figures, the conditioning arrangement 146 includes a first conditioner roller 148 and a second conditioner roller 150. The first and second conditioner rollers 148, 150 may include projections 147 that project radially and that extend helically about the respective roller. As will be discussed, crop material 136 may pass between the first and second conditioner rollers 148, 150 and the projections 147 may crimp, crush, or otherwise condition the crop material 136 (e.g., the stems of the crop material 136) as it passes between the rollers 148, 150. This conditioning may promote even drying of the crop material 136 as will be appreciated by those having ordinary skill in the art.

The first conditioner roller 148 may be elongate and may extend laterally between the first side 132 and the second side 134 of the frame 122. The ends of the first conditioner roller 148 may be mounted to the frame 122 (i.e., the support structure), proximate the first side 132 and the second side 134. The first conditioner roller 148 may be mounted for rotation relative to the frame 122 about an axis 149 that is substantially parallel to the lateral axis 116. In some embodiments, the rotation axis 149 of the first conditioner roller 148 may be disposed in a substantially fixed position relative to the frame 122. Thus, the first conditioner roller 148 may be referred to as a "fixed" roller.

The second conditioner roller 150 may be substantially similar to the first conditioner roller 148. The second conditioner roller 150 may be mounted to the frame 122 at each lateral end and may rotate about an axis 151. The axis 151 may extend substantially along the lateral axis 116. The second conditioner roller 150 may be spaced apart at a distance from the first conditioner roller 148. In other words, a gap 152 may be defined between the first and second conditioner rollers 148, 150. In the illustrated embodiment, the gap 152 is indicated between the axis 149 of the first conditioner roller 148 and the axis 151 of the second conditioner roller 150. However, the gap 152 may be measured from an outer radial boundary of the first conditioner roller 148 and an opposing outer radial boundary of the second conditioner roller 150. It will be appreciated that the dimension of the gap 152 may affect conditioning of the crop material 136 that passes between the first and second conditioner rollers 148, 150.

In addition to rotation about the axis 151, the second conditioner roller 150 may be supported for movement (linear or angular) relative to the first conditioner roller 148 to vary the dimension of the gap 152. In some embodiments, the second conditioner roller 150 may move at least partially along the vertical axis 118 relative to the first conditioner roller 148.

In the illustrated embodiment of FIGS. 2 and 3, the first and second conditioner rollers 148, 150 are shown at a neutral position relative to each other. The second conditioner roller 150 may be supported to move away from this neutral position (to a displaced position) to thereby increase the gap 152. In some embodiments, the conditioning arrangement 146 may further include at least one biasing member 154 (shown schematically). The biasing member 154 may be of any suitable type, such as a mechanical spring, a hydraulic biasing member, etc. The biasing member 154 may be mounted to the frame 122 and to the first and/or second conditioner roll 148, 150. More specifically, in some embodiments, the biasing member 154 may be mounted to the frame 122 and the second conditioner roller 150 such that the biasing member 154 biases the second conditioner roller 150 relative to the frame 122. The biasing member 154 may bias the second conditioner roller 150 toward the neutral position. Biasing force provided by the biasing member 154 may be relatively high so as to maintain the gap 152 (i.e., maintain the first and second conditioner rollers 148, 150 at the neutral position) as the crop material 136 moves through the conditioning arrangement 146. However, a large slug of crop material 136, rocks, or other objects may force the second conditioner roller 150 away from the first conditioner roller 148 against the biasing force of the biasing member 154, thereby increasing the gap 152. Once the material has cleared from between the first and second conditioner rollers 148, 150, the biasing member 154 may bias the second conditioner roller 150 back toward the neutral position.

Figure 4:
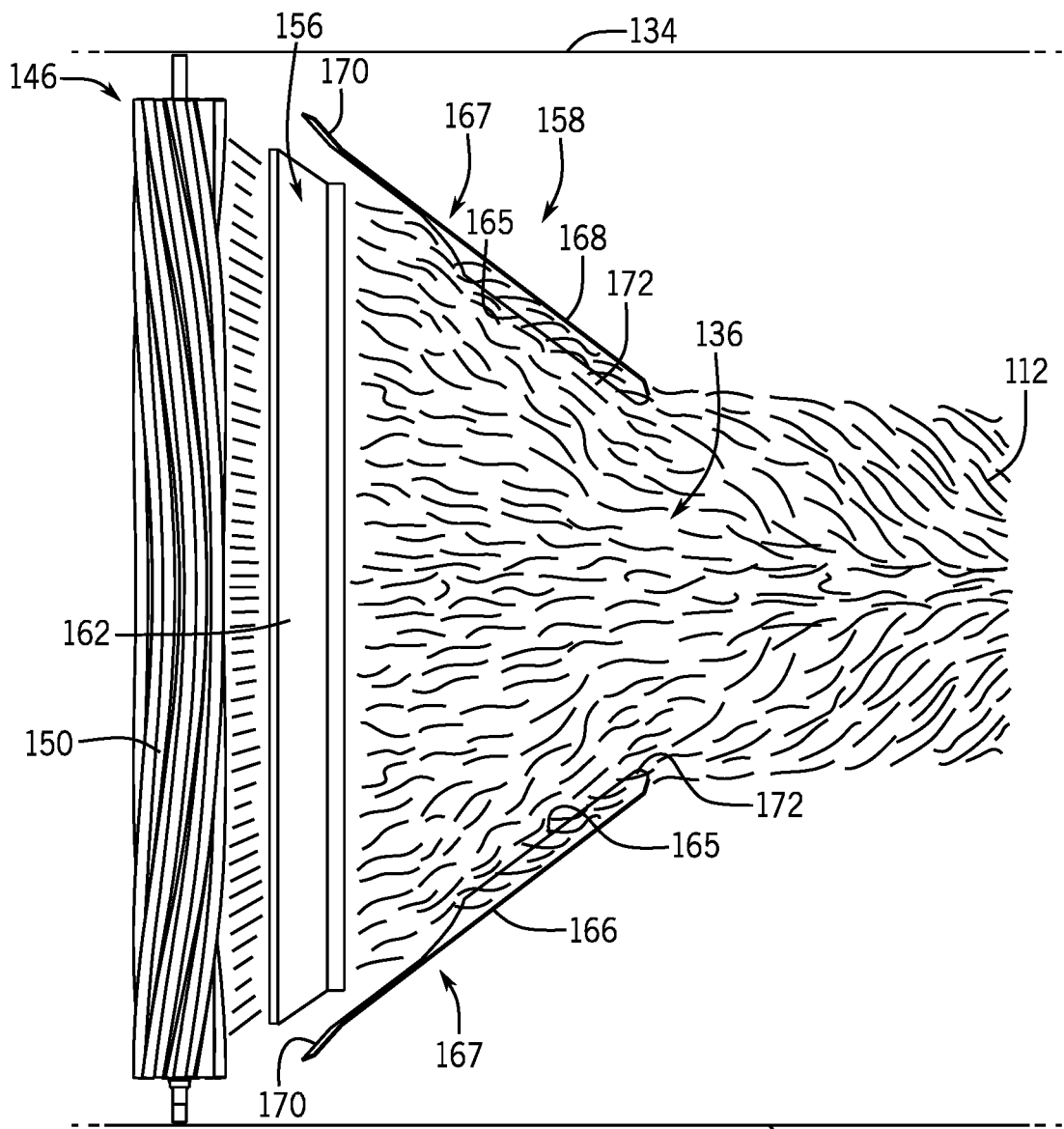
FIG. 4 is a schematic top view of the work vehicle of FIG. 2, wherein some arrangements are shown in a first position.
Figure 5:
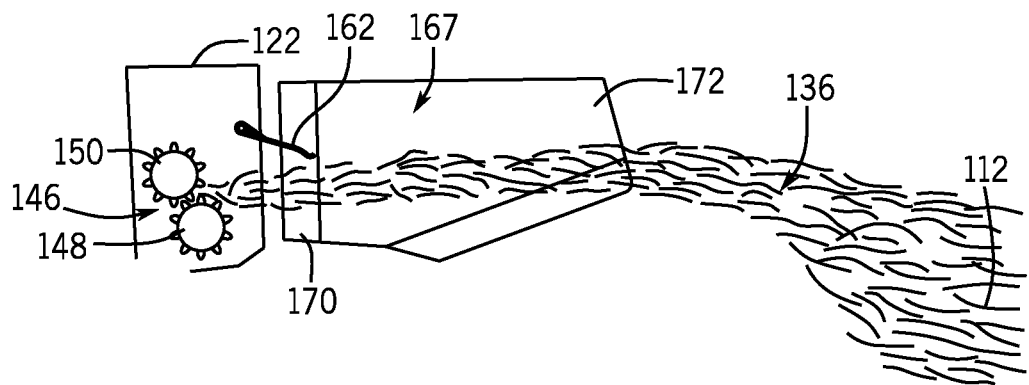
FIG. 5 is a schematic side view of the windrowing apparatus of FIG. 2, wherein the arrangements are shown in the first position.
Figure 6:
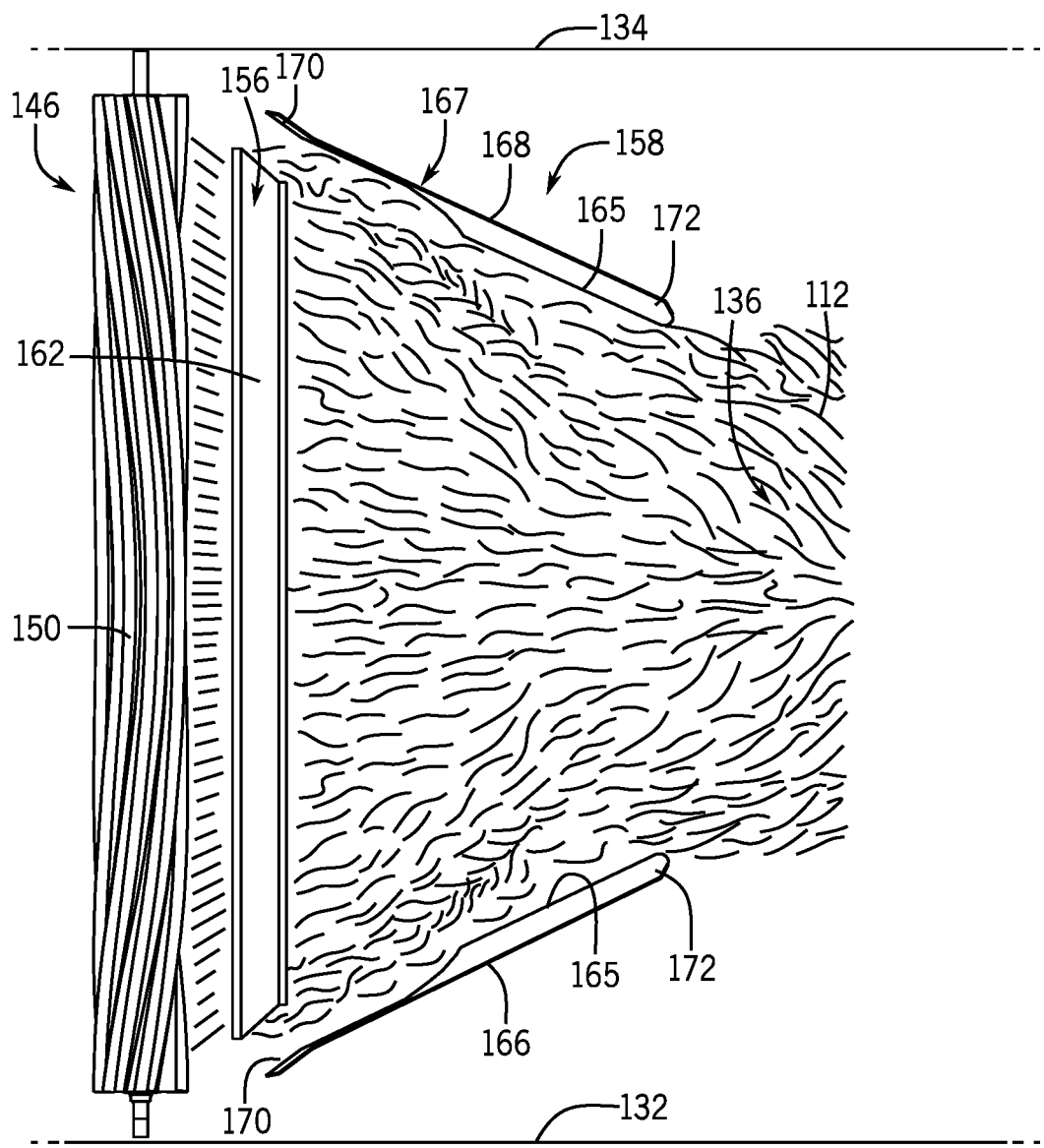
FIG. 6 is a schematic top view of the windrowing apparatus of FIG. 2, wherein the arrangements are shown in a second position.

The windrower 100 may further include at least one windrowing arrangement (i.e., windrow-shaping implement, tool, etc.) that is configured to shape, arrange, or otherwise form a windrow of the crop material 136. For example, as shown in FIGS. 2-7, the windrower 100 may include a first windrowing arrangement 156 (e.g., a swath flap arrangement) and a second windrowing arrangement 158 (e.g., a forming shield arrangement). In some embodiments, the first windrowing arrangement 156 may comprise a so-called swath flap 162 (i.e., swath board). Also, in some embodiments, the second windrowing arrangement 158 may comprise so-called forming shields 167 (FIGS. 4 and 6).

As illustrated, the first windrowing arrangement 156 may include a support structure 160, such as a transversely extending tube, that is attached to the frame 122 at both ends. The first windrowing arrangement 156 may also include a swath flap 162. The swath flap 162 may be an elongate member that extends substantially along the lateral axis 116. The first windrowing arrangement 156 may be mounted to the support structure 160 and may extend rearward therefrom. The swath flap 162 may include a substantially wide, flat, and smooth deflecting surface 161. The swath flap 162 may be supported for rotation about a transverse axis 164 of the support structure 160 to change an angle of the surface 161 with respect to the ground. As illustrated in FIGS. 4-7, the swath flap 162 may rotate between a raised position (FIGS. 4 and 5) and a lowered position (FIGS. 6 and 7) to change the position of the deflecting surface 161 relative to the crop material 136 received from the conditioning arrangement 146.

The second windrow shaping implement 158 may include at least one forming shield 167. The forming shield 167 may be substantially wide, flat, and smooth and may include at least one deflecting surface 165. The deflecting surface 165 may include a leading end 170 and a trailing end 172. As shown in FIGS. 4 and 6, the second windrow shaping implement 158, may include a first shield 166 and a second shield 168, each with a respective deflecting surface 165. The first shield 166 may be mounted proximate the first side 132 of the frame 122, and the second shield 168 may be mounted proximate the second side 134 of the frame 122. The deflecting surfaces 165 of the first and second shields 166, 168 may face each other and may converge rearward for shaping the crop material 136 into the windrow 112. The leading end 170 of the shields 166, 168 may flare outwardly to a slight extent, while the lower rear margins proximate the trailing end 172 may curl slightly inwardly. In other words, the deflecting surfaces 165 may cooperate to form a somewhat funnel-shaped passage to taper down the stream of crop material 136 issuing from the conditioning arrangement 146 and impinging upon the first and second shields 166, 168.

In some embodiments, the first and second shields 166, 168 may be supported for rotation about a vertical axis (i.e., an axis substantially parallel to the vertical axis 118). The first and second shields 166, 168 may be moved to change the amount of convergence provided by the shields 166, 168. As illustrated in FIGS. 4-7, the shields 166, 168 may rotate between a first position (FIGS. 4 and 5) and a second position (FIGS. 6 and 7) to change the amount of tapering of the deflecting surfaces 165 along the longitudinal axis 114. The shields 166, 168 may cooperate to define a wider funnel-like shape in the second position (FIGS. 6 and 7) as compared to the narrower first position (FIGS. 4 and 5). The shields 166, 168 may be moved in a coordinated manner such that the window is formed generally along a longitudinal axis of the windrower 100. In some embodiments, one of the shields 166, 168 may be shifted closer to the longitudinal axis than the other shield 166, 168 such that the window is formed to one side of the longitudinal axis. Other movements of the shields 166, 168 also fall within the scope of the present disclosure.

Figure 7:
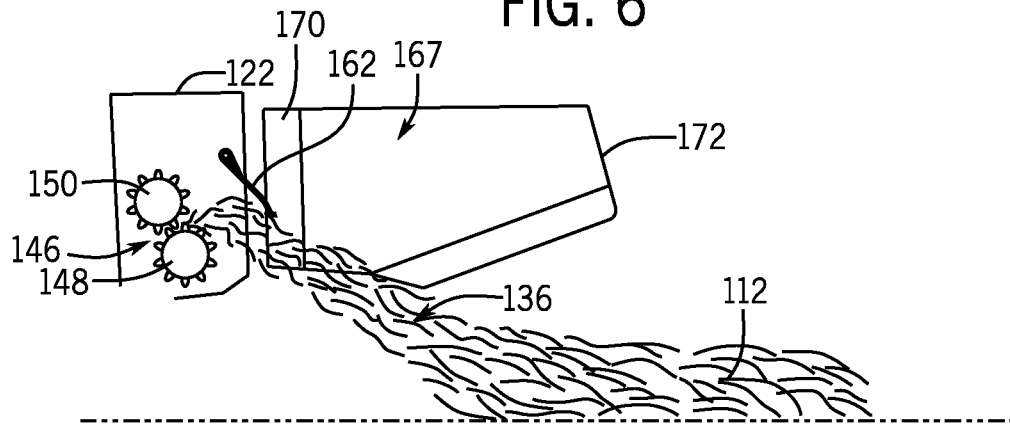
FIG. 7 is a schematic side view of the windrowing apparatus of FIG. 2, wherein the arrangements are shown in the second position.

If the swath flap 162 of the first windrowing arrangement 156 is raised and the shields 166, 168 are disposed in the first position as illustrated in FIGS. 4 and 5, the stream may bypass the swath flap 162 and may be acted upon by the shields 166, 168 to form the windrow 112 in accordance with the position of the shields 166, 168. On the other hand, if the swath flap 162 is lowered and the shields 166, 168 are in the second position as illustrated in FIGS. 6 and 7, the stream may be intercepted by the swath flap 162 and directed down to the ground without engaging the shields 166, 168. In some embodiments, in the position of FIGS. 4 and 5, the windrow 112 may be formed narrower and more densely with crop material 136, and in the position of FIGS. 6 and 7, the windrow 112 may be formed wider and less densely. However, it will be appreciated that the width, shape, or other characteristic of the windrow 112 may be controlled in other ways.

As shown in FIG. 3, the windrower 100 may additionally include an actuator system 174. The actuator system 174 may include at least one actuator, such as an electric motor, a hydraulic actuator, or a pneumatic actuator of a known type. The actuator(s) may be configured for actuating the various implements discussed above. In some embodiments, at least one actuator may be a linear actuator with a first member and a second member that actuates linearly with respect to the first member. The first member may be fixed to the frame 122 and/or the chassis 106, and the second member may be fixed to the respective implement. Thus, the second member and the respective implement may actuate together with respect to the first member. Also, in some embodiments, linear actuation of the actuator may rotate the respective implement about its axis of rotation. In some embodiments, all or most of the actuators of the actuator system 174 are linear actuators. Furthermore, actuators of the actuator system 174 may include integrated sensors and may be interconnected to a control system via a CAN bus connection or otherwise. In some embodiments, a suitable switch may be provided in the operator compartment 108 of the tractor 102 for providing a user input for actuating the actuator. In additional embodiments, the actuators may be in communication with a controller that automatically actuates the actuator. Accordingly, the actuators may be reliable, highly programmable, and may provide accurate and controlled movement of the implement. Also, in some embodiments, the actuators may provide position feedback data that corresponds to the actual and current position of the implement as will be discussed in greater detail below.

As shown in FIG. 3, the actuator system 174 may include at least one first actuator 176, which is operably coupled to the conditioning arrangement 146 and is configured for varying one or more parameters of the conditioning arrangement 146. In some embodiments, there may be a plurality of first actuators 176 for changing settings, variable parameters, etc. for the conditioning arrangement 146. The first actuators 176 may include a gap-adjustment actuator 175 and a bias-adjustment actuator 177. Additionally, in some embodiments, the first actuators 176 may include additional actuators configured for rotating the conditioner rollers 148, 150 about their respective axes of rotation 149, 151.

More specifically, there may be at least one gap-adjustment actuator 175 that is configured for changing the gap 152 between the first and second conditioner rollers 148, 150. In some embodiments, the gap-adjustment actuator 175 may be operably connected to the frame 122 and the second conditioner roller 150, and the gap-adjustment actuator 175 may be configured to move the second conditioner roller 150 relative to the frame and relative to the first conditioner roller 148. As such, the gap-adjustment actuator 175 may selectively vary the dimension of the roll gap 152 at the neutral position of the first and second conditioner rollers 148, 150. In additional embodiments, the gap-adjustment actuator 175 may move the first conditioner roller 148 instead of or in addition to the second conditioner roller 150 to vary the gap 152.

The bias-adjustment actuator 177 may be operably coupled to the biasing member 154, and may be configured for selectively varying the biasing force that the biasing member 154 provides (e.g., the biasing force provided to the second conditioner roller 150) at the neutral position. For example, the bias-adjustment actuator 177 may actuate to change the length of the biasing member 154 when the conditioning arrangement 146 is in the neutral position to thereby vary the biasing force provided by the biasing member 154. In cases of a hydraulic biasing member, the bias-adjustment actuator 177 may change a fluid pressure for changing the biasing force.

Furthermore, the actuator system 174 may include at least one second actuator 178. The second actuator 178 may be operably coupled to the swath flap 162 for rotating the swath flap 162 about the axis 164. For example, the second actuator 178 may move the swath flap 162 between the raised position of FIGS. 4 and 5 and the lowered position of FIGS. 6 and 7.

Additionally, the actuator system 174 may include at least one third actuator 180. The third actuator 180 may be operably coupled to one or both forming shields 167. The third actuator 180 may be configured for moving the forming shields 167 between the first position of FIGS. 4 and 5 and the second position of FIGS. 6 and 7. In some embodiments, each forming shield 167 may respectively include an independent third actuator 180 such that the forming shields 167 may articulate independent of each other relative to the frame 122 of the windrower 100.

Moreover, the actuator system 174 may include at least one fourth actuator 182. The fourth actuator(s) 182 may be operably coupled to the cutting arrangement 140 for actuating the blades 142 in some embodiments. Also, in some embodiments, the fourth actuator(s) 182 may be operably coupled to the conveyor arrangement 144 for rotating the conveyor arrangement 144. In further embodiments, the fourth actuator(s) 182 may be operably coupled to the frame 122 for controlled lifting and lowering of the frame 122 relative to the chassis 106 of the tractor 102. The fourth actuator(s) 182 may also rotate the wheels 110 of the tractor 102 or actuate another component. In this regard, the fourth actuator(s) 182 may receive power from a power plant, such as a diesel engine, an electrical power source, a hydraulic pump, etc.

In some embodiments, the first, second, and third actuators 176, 178, 180 may re-configure, shift, and re-position the second conditioner roller 150, the swath flap 162, and/or the forming shields 167 on-demand by the user using user controls in some embodiments. These components may be shifted between the positions shown in FIGS. 4 and 5 and the positions shown in FIGS. 6 and 7. Also, these components may be shifted to various intermediate positions therebetween. Thus, the windrower 100 may be configured for windrowing/swathing quickly and easily while the windrower 100 is moving across a field and without the operator leaving the operator compartment 108.

The actuators 176, 178, 180 may be stopped at any one of numerous positions by the operator without leaving the operator compartment 108. Accordingly, the amount of conditioning (i.e., the amount of crimp or compression) of the crop material 136 may be adjusted by moving the second conditioner roller 150 and changing the gap 152. Also, the amount of conditioning may be adjusted by changing the biasing force of the biasing member 154. Furthermore, the shape, arrangement, density, or other characteristic of the windrow 112 may be quickly and easily adjusted by moving the swath flap 162 and/or the forming shields 167. For example, the operator may choose to form a wider windrow 112 such that the crop material 136 dries more quickly. Similarly, if the freshly-cut crop material 136 is wetter than normal, the windrow 112 may be made wider for increased drying. Conversely, the windrow 112 may be made more narrow in consideration of subsequent processing that is to occur (e.g., chopping, raking, gathering, or other processing of the crop material 136 within the windrow 112). Also, the windrow 112 may be made more narrow and dense, for example, to avoid excessive sun bleaching of the crop material 136 within the windrow 112.

Figure 8:
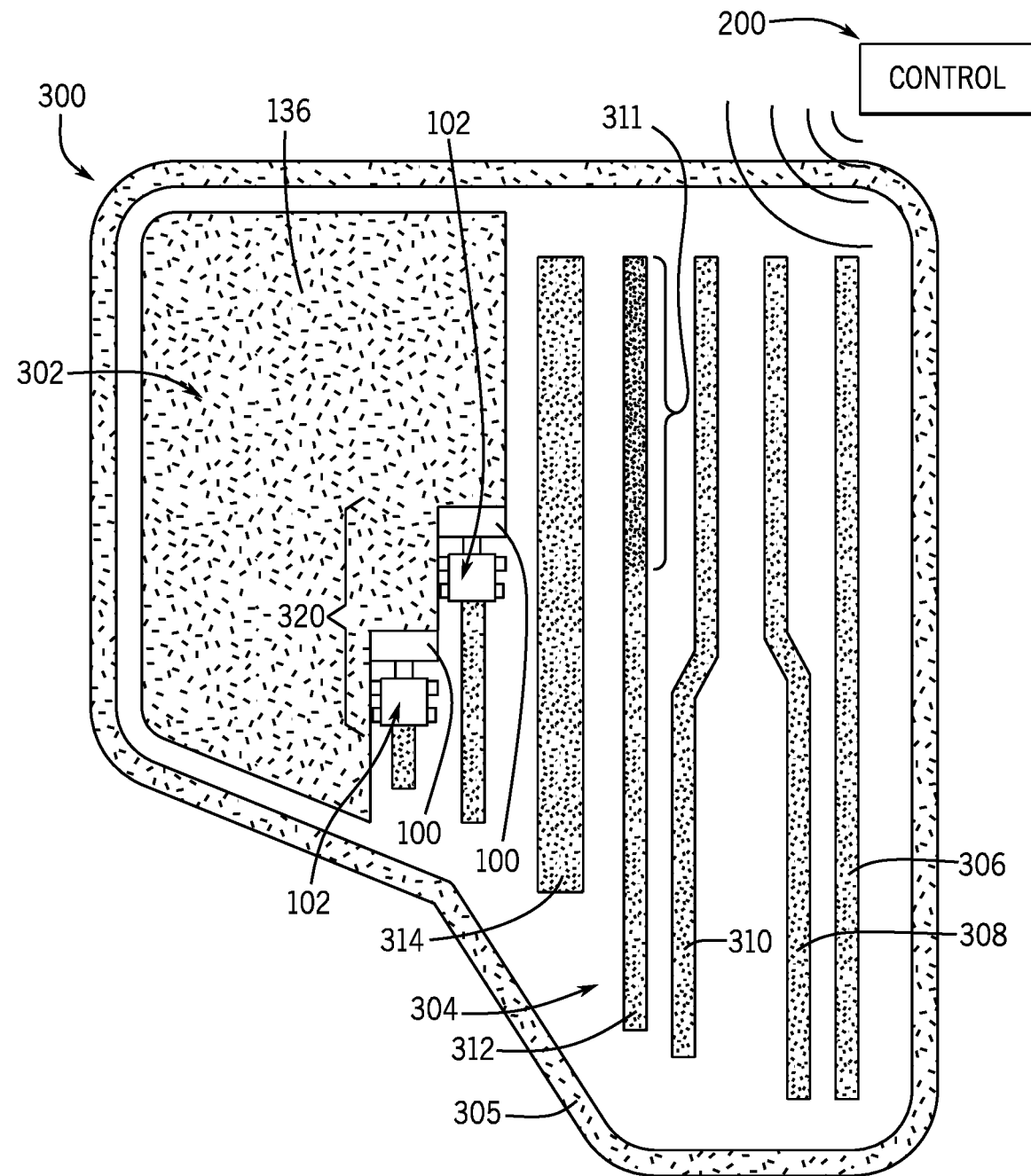
FIG. 8 is a schematic aerial view of a field of crop material shown with a fleet of work vehicles shown performing windrowing operations.

A field 300 of crop material 136 is shown in FIG. 8 to further illustrate aspects of the present disclosure. As shown, the field 300 is shown in the process of being harvested. Specifically, a fleet 320 of tractors 102 (each with a respective windrower 100) is shown during a windrowing operation. In the illustrated embodiment, the field 300 includes a windrowed portion 304 and an unharvested portion 302. Within the windrowed portion 304, a continuous outer boundary windrow 305 has been formed as well as a number of interior windrows. The interior windrows may be encompassed by the outer boundary windrow 305 and may include a first inner windrow 306, a second inner windrow 308, a third inner windrow 310, a fourth inner windrow 312, and a fifth inner windrow 314. The tractors 102 are shown travelling through the unharvested portion 302 of the field 300, forming additional windrows of the crop material 136. As shown in FIG. 8, the conditioning, the shape, dimensions, placement, and other characteristics of the windrows may be controlled using the systems and methods of the present disclosure.

For example, by controlling the position of the conditioning arrangement 146, the amount of conditioning (e.g., the amount of crimping) may be affected. As represented by the hatching styles in FIG. 8, an end 311 of the fourth inner windrow 312 may be conditioned more than the opposite end. For example, when the windrower 100 forms the end 311, the second conditioner roller 150 may be moved closer to the first conditioner roller 148 (i.e., the gap 152 at the neutral position may be reduced) for increased crimping and conditioning. In contrast, when the windrower 100 forms the opposite end of the windrow 312, the second conditioner roller 150 may be moved further away from the first conditioner roller 148 (i.e., the gap 152 at the neutral position may be increased). The gap 152 may be adjusted in this manner, for example, based on the density of the uncut crop material 136 or due to other considerations.

Also, by lowering the swath flap 162, the fifth inner windrow 314 may be formed at a greater width than the other windrows. Again, it may be advantageous to increase the width of the windrow to decrease drying time or for other considerations.

Moreover, by raising the swath flap 162 and moving the forming shields 167, the first inner windrow 306 may be made narrower than, for example, the fifth inner windrow 314. Furthermore, by moving one forming shield 167 laterally inward and the other forming shield laterally outward 167, the windrow may be displaced to one side. For example, one end of the second inner windrow 308 may be shifted closer to the first inner windrow 306 as compared to the opposite end of the second inner windrow 308. Likewise, one end of the third inner windrow 310 may be shifted closer to the fourth inner windrow 312 as compared to the opposite end of the third inner windrow 310. Accordingly, the amount of conditioning and the shape and placement of the windrows may be highly controllable. This may be useful, for example, for facilitating subsequent processing of the crop material, for controlling drying of the crop material, to separate weeds or other waste from useable crop material, etc.

As shown in FIG. 3, the windrower 100 may additionally include a sensor system 184. The sensor system 184 may include one or more sensors that, for example, detect conditions related to the conditioning arrangement 146, the swath flap 162, and/or the forming shields 167. In some embodiments, the sensors may detect an actual (current) position or other setting of the conditioning arrangement 146, the swath flap 162, and/or the forming shields 167 as will be discussed. Other sensors may be included as well for detecting conditions related to the windrowing operations as discussed below.

The sensors of the sensor system 184 may be of any suitable type. For example, sensors that detect position may include a potentiometer, a Hall Effect sensor, a proximity sensor, a microelectromechanical sensor (MEMS), a laser, an encoder, an infrared sensor, a camera, or other type. The sensors of the sensor system 184 may be integrated sensors, which are combined or "integrated" with signal processing hardware in a compact device. The sensors of the system 184 may also be operably connected to corresponding actuators of the actuator system 174 for gathering data therefrom. In some embodiments, these sensors may detect a position of an implement by detecting an electrical, magnetic, or other visual condition that is related to the position of the implement. Additionally, the sensor system 184 may include one or more components that, for example, communicate with a global positioning system (GPS) that provides sensor input regarding the current position of one or more of the implements. The sensor input may be associated with stored data, such as maps, geo-coordinate markers, and so on, to reconcile the real-time machine and implement position in three-dimensional space with known objects and locations of a preset field.

Also, in some embodiments, the sensors may be incorporated within one of the actuators within the actuator system 174. Furthermore, while some sensors may be mounted to the windrower 100, other sensors of the sensor system 184 may be remote from the windrower 100 as will be discussed.

As shown in FIG. 3, the sensor system 184 may include at least one first sensor 186, which is operably coupled to the conditioning arrangement 146 and/or the first actuator(s) 176. The first sensors 186 may include a roller sensor 185 that is configured for detecting the position of the first and/or second roller 148, 150. The roller sensor 185 may also be configured for detecting the actual (current) dimension of the gap 152 between the first and second conditioner rollers 148, 150. The roller sensor 185 may also be configured for detecting the gap 152 as it changes over a predetermined time period. In other words, the roller sensor 185 may detect a dynamic position of the second conditioner roller 150 relative to the first conditioner roller 148. Furthermore, in some embodiments, the first sensors 186 may include a bias sensor 187 configured to detect the biasing load provided by the biasing member 154. Additionally, in some embodiments, the first sensors 186 may include a sensor that detects the angular speed or other related condition of the first and second conditioner rollers 148, 150.

The sensor system 184 may further include at least one second sensor 188. The second sensor 188 may be operably coupled to the swath flap 162 in some embodiments. The second sensor 188 may detect the actual (current) position of the swath flap 162. For example, the second sensor 188 may detect the angle of the deflecting surface 161 relative to the frame 122 and/or relative to the ground.

Additionally, the sensor system 184 may include at least one third sensor 190. The third sensor 190 may be operably coupled to one or more of the forming shields 167. The third sensor 190 may detect the position of the shields 167 with respect to each other, with respect to the frame 122, and/or with respect to the chassis 106.

Moreover, the sensor system 184 may include at least one fourth sensor 192. In some embodiments, the fourth sensor 192 may be operably coupled to the cutting arrangement 140 for detecting the cutting speed of the blades 142. In additional embodiments, the fourth sensor 192 may be operably coupled to the conveyor arrangement 144 for detecting the angular speed of the conveyor arrangement 144. The fourth sensor 192 may also be configured for detecting other conditions of the windrower 100 and/or tractor 102. For example, the fourth sensor 192 may be configured as a speedometer that detects the ground speed of the tractor 102. The fourth sensor 192 may also detect the current position of the frame 122 of the windrower 100 relative to the chassis 106 in some embodiments.

In additional embodiments, the sensor system 184 may include a fifth sensor 194. The fifth sensor 194 may be configured to detect the actual (current) location of the windrower 100 within a field of crop material 136. In some embodiments, the fifth sensor 194 may also detect the travel direction of the windrower 100 as it moves through the field. For example, the sensor system 184 may automatically detect the geolocation of the windrower 100, for example, by communicating with a global positioning system (GPS) of a known type. In other embodiments, the sensor system 184 may detect the location of the windrower 100 within the field using telemetry data that is local to the particular field. Furthermore, in some embodiments, the fifth sensor 194 may include a GPS transceiver unit mounted directly to the frame 122 or other location on the windrower 100.

Moreover, the sensor system 184 may include a sixth sensor 196. The sixth sensor 196 may be configured to detect a condition of the crop material 136. For example, in some embodiments, the sixth sensor 196 may detect conditions relating to the uncut crop material 136 (e.g., the type of crop being harvested, the density of the crop material 136, areas within the field that are particularly wet, areas that include weeds, areas that include obstacles, or other conditions). Furthermore, in some embodiments, the sixth sensor 196 may detect a condition related to the windrow 112 (e.g., the width or other dimension of the windrow, etc.). It will be appreciated that the sixth sensor 196 may be mounted to the windrower 100 and/or the tractor 102. In other embodiments, the sixth sensor 196 may be remote. For example, the sixth sensor 196 may be included on an aircraft or a ground-based station and may communicate with the windrower 100 as discussed in detail below.

Figure 9:
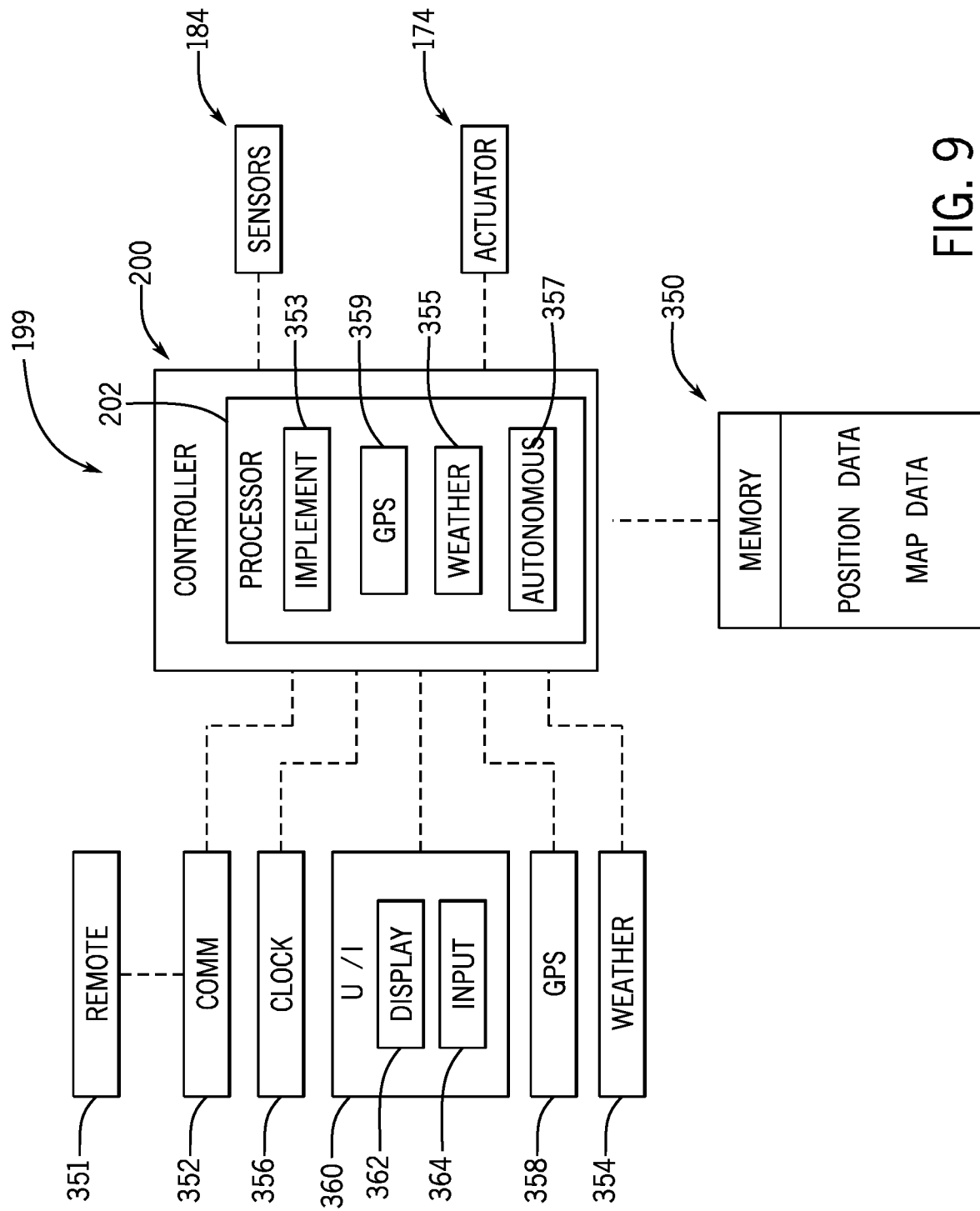
FIG. 9 is a schematic view of a control system of the work vehicle.

Referring now to FIG. 9, a control system 199 of the windrower 100 will be discussed according to example embodiments. As shown, a user interface 360 may be included. The user interface 360 may be disposed substantially within the operator compartment 108 (FIG. 1) of the tractor 102. Generally, the user interface 360 may include at least one input device 364 with which the user may input a user command. The user interface 360 may also include an output device, such as a display 362, which outputs feedback and other information to the user. The input device 364 may have a variety of configurations without departing from the scope of the present disclosure. In some embodiments, the input device 364 may include one or more joysticks, various switches or levers, one or more buttons, a touch sensitive surface or screen, a keyboard, a microphone associated with a speech recognition system, etc. The display 362 may be of any suitable type, such as a LCD screen, or otherwise, for outputting visual information. It will be appreciated that the user interface 360 may also include a speaker for outputting audio information or another type of output device.

The user interface 360 may be operably connected to a controller 200. The user interface 360 may provide control inputs to the controller 200, which may, in turn, cooperate to control various ones of the associated actuators of the actuator system 174.

The controller 200 may be configured for controlling various features of the windrower 100 and, in some embodiments, for controlling features of the tractor 102. In some embodiments, the controller 200 may be supported on the tractor 102. Also, in some embodiments aspects of the controller 200 may be remote to the tractor 102. The controller 200 may be in electronic, hydraulic, mechanical, or other communication with the actuators of the actuator system 174, the sensors of the sensor system 184, or other components.

Additionally, a communication device 352 may be provided, and the communication device 352 may enable the controller 200 to send signals to and/or receive signals from the actuators of the actuator system 174, the sensors of the sensor system 184, a remote control device 351 that is remote from the windrower 100, and/or other devices. In some embodiments, the communication device 352 may provide two-way communication with the other components. The controller 200 may communicate with these components in various known ways, including via a CAN bus (not shown) of the windrower 100, via wireless communication (e.g., Wi-Fi, BLUETOOTH™, etc.), via hydraulic communication means, or otherwise.

The communication device 352 may also communicate with one or more remote systems, such as a Global Positioning System (GPS) 358 and/or a weather data station 354, etc. The GPS 358 may be of a known type and may provide satellite-based geolocation data for locating various components of the windrower 100. The weather data station 354 may provide weather data corresponding to the current weather conditions (e.g., temperature, humidity, etc.) and/or a weather forecast. This information may be provided to the controller 200, for example, to affect control of the windrower 100.

Furthermore, a clock device 356 may be included. The clock device 356 may detect the current time of day, the date, the current season, or other associated time-based information. The clock device 356 may also provide a timer, a stopwatch, an alarm, or other time-based feature. The clock device 356 may be incorporated within the controller 200 in some embodiments, or in other embodiments, the clock device 356 may be remote from the windrower 100.

Additionally, a memory element 350 may be provided that is in communication with the controller 200. The memory element 350 may incorporate one or more data storage devices. In some embodiments, the memory element 350 may store one or more settings, such as set positions of the second conditioner roller 150, and the settings may be saved as preset position data. The memory element 350 may also store one or more preset positions of the swath flap 162 as preset position data. Furthermore, the memory element 350 may store one or more preset positions of the forming shields 167 as preset position data. Furthermore, the memory element 350 may store map data, which may be associated with the position data. For example, the map data may include geolocation data that is associated with the position data such that the memory element 350 stores the settings (positions) of one or more implements for a particular location within the field. Other information may also be associated within the map data, such as the time of season, the weather conditions, the crop type, and/or other information.

The controller 200 will now be discussed in greater detail. The controller 200 may be configured as a computing device with an associated processor 202. The controller 200 may include or otherwise communicate with the devices discussed above via a hard-wired computing circuit (or circuits), a programmable circuit, a hydraulic, electrical or electro-hydraulic controller, or otherwise. As such, the controller 200 may be configured to execute various computational and control functionality with respect to the windrower 100 (or other machinery).

In some embodiments, the controller 200 may be configured to receive input signals in various formats (e.g., as voltage signals, current signals, hydraulic signals, and so on), and to output command signals in various formats (e.g., as voltage signals, current signals, hydraulic signals, mechanical movements, and so on).

The controller 200 may, thus, send control signals to one or more actuators of the actuator system 174 for changing and controlling the position of the implements of the windrower 100. It will be appreciated that the controller 200 may also send control signals to an accelerator, a braking system, and the like for changing the ground speed of the tractor 102.

Moreover, the controller 200 may send control signals to a steering system associated with the wheels 110 for changing the travelling direction of the tractor 102.

The controller 200 may generate (i.e., process) control signals based on one or more input signals. For example, the controller 200 may generate these signals based on signals received from: (1) the input device 364 of the user interface 360; (2) the sensors of the sensor system 184; (3) presets stored in the memory element 350; (4) the GPS 358; (5) the weather station 354; (6) the clock device 356; and/or (7) other components within (or outside of) the windrower 100.

The controller 200 may also include any number of other modules or sub-modules embedded, for example, within the processor 202. In various embodiments, the controller 200 includes an implement command (IC) module 353 that enables communication and processing of control signals for positioning of at least one implement of the windrower 100. The controller 200 may also include a GPS module 359 that may enable communication with and processing of geolocation signals received from the GPS 358. Additionally, the controller 200 may include a weather module 355 that may enable communication with and processing of weather data received from the weather station 354. Also, the controller 200 may include an autonomous module 357 that generates control signals for operating the windrower 100 autonomously. Although not shown, the controller 200 may include additional modules, such as an input/output (I/O) module for operation of the user interface 360, a remote communications module for communication and interaction with the remote control device 351, etc.

Figure 10:
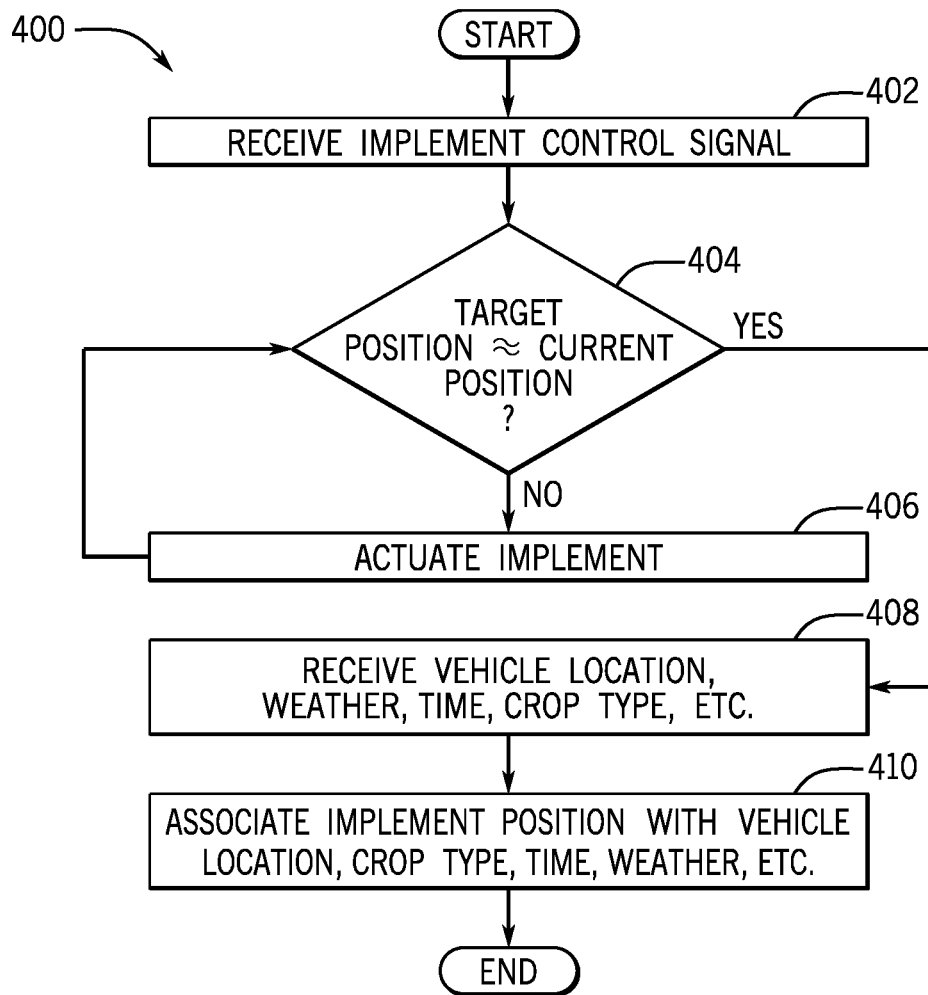
FIG. 10 is a flowchart illustrating a method of operating the work vehicle.

Referring now to FIG. 10, a method 400 of operating the windrower 100 will be discussed according to example embodiments of the present disclosure. It will be appreciated that the method 400 may be employed for adjusting the settings for the conditioning arrangement 146, the swath flap 162, and/or the forming shields 167 (i.e., at least one "implement" as noted in FIG. 10). As an illustrative example, it will be assumed that this is a first use of the windrower 100 (i.e., a first harvest of crop material within a particular field). The operator may drive the tractor 102 through the field 300, conditioning the crop material and creating windrows 112. As will be discussed, the settings of conditioning arrangement 146, the swath flap 162, and/or the forming shields 167 may be collected and recorded in the memory element 350 as presets that may be used in the future.

More specifically, at 402, the operator may manipulate the input devices 364 for moving the implement(s). As a result, the processor 202 may generate corresponding control signals and send the signals to the actuator system 174 for adjusting the implement settings. These adjustments may be made initially and/or as the windrower 100 moves through the field (on-the-fly adjustment). As a specific example, if the operator wants more conditioning to occur, the operator may manipulate a dedicated input device 364, the processor 202 may generate a corresponding conditioner control signal, and the signal may be sent to the gap-adjustment actuator 175 for moving the second conditioner roller 150 closer to the first conditioner roller 148. In addition, or in the alternative, the processor 202 may receive a user input and generate a corresponding control signal for adjusting the bias force provided by the biasing member 154. A similar process may occur if the operator wishes to re-position the swath flap 162 and/or the shields 167.

In some embodiments, one or more sensors of the sensor system 184 may provide feedback (e.g., position feedback) to the processor 202 as to the actual settings of the implement(s). More specifically, in some embodiments, the sensor 187 may detect the actual setting for the biasing member 154, the sensor 185 may detect the actual dimension of the roll gap 152, the sensor 188 may detect the actual position of the swath flap 162, and/or the sensor 190 may detect the actual position of the forming shields 167. In some embodiments, at 404, the processor 202 may compare the detected position of the implements to the target position commanded at 402. If the target position is not substantially equal to the current position, then the processor 202 may generate a positioning control signal to the actuator system 174 for actuating the implement(s). The actuators of the actuator system 174 may operate according to the control signal to actuate the implements. The sensor system 184 may continuously provide feedback as to the current position of the implements. The method 400 may loop back to decision block 404 until the target position of the implements is approximately equal to the current position of the implements.

Once decision block 404 is answered affirmatively (i.e., the implements are in the position commanded at 402), the method 400 may continue at 408. At 408, the processor 202 may receive the current vehicle location from the GPS 358, the current weather conditions (e.g., from the weather station 354), the current time or season (e.g., from the clock device 356), the current crop type being harvested, and/or other current conditions. Then, at 410, the processor 202 may associate the positions of the implements commanded at 402 with the current conditions observed at 408.

Accordingly, in some embodiments, a map file may be generated and stored. The map file may dictate where the implements were positioned at particular locations within the field 300. The map file may also indicate the weather conditions when the harvesting occurred, the type of crop harvested, the time of season that harvesting occurred, or other information. Also, in some embodiments, the map file may associate the positions of the implements with particular locations within the field 300. Thus, one set of implement settings may be established in the map file for one area of the field, and a different set of implement settings may be established for a different area of the field. Similarly, the map file may indicate implement settings for particularly wet spots in the field, and the map file may indicate other implement settings for areas with less sun exposure, etc.

The method 400 may terminate after 410. It will be appreciated that the method 400 may be repeated as the windrower 100 moves through the field 300 and as the windrowing operation is performed.

Figure 11:
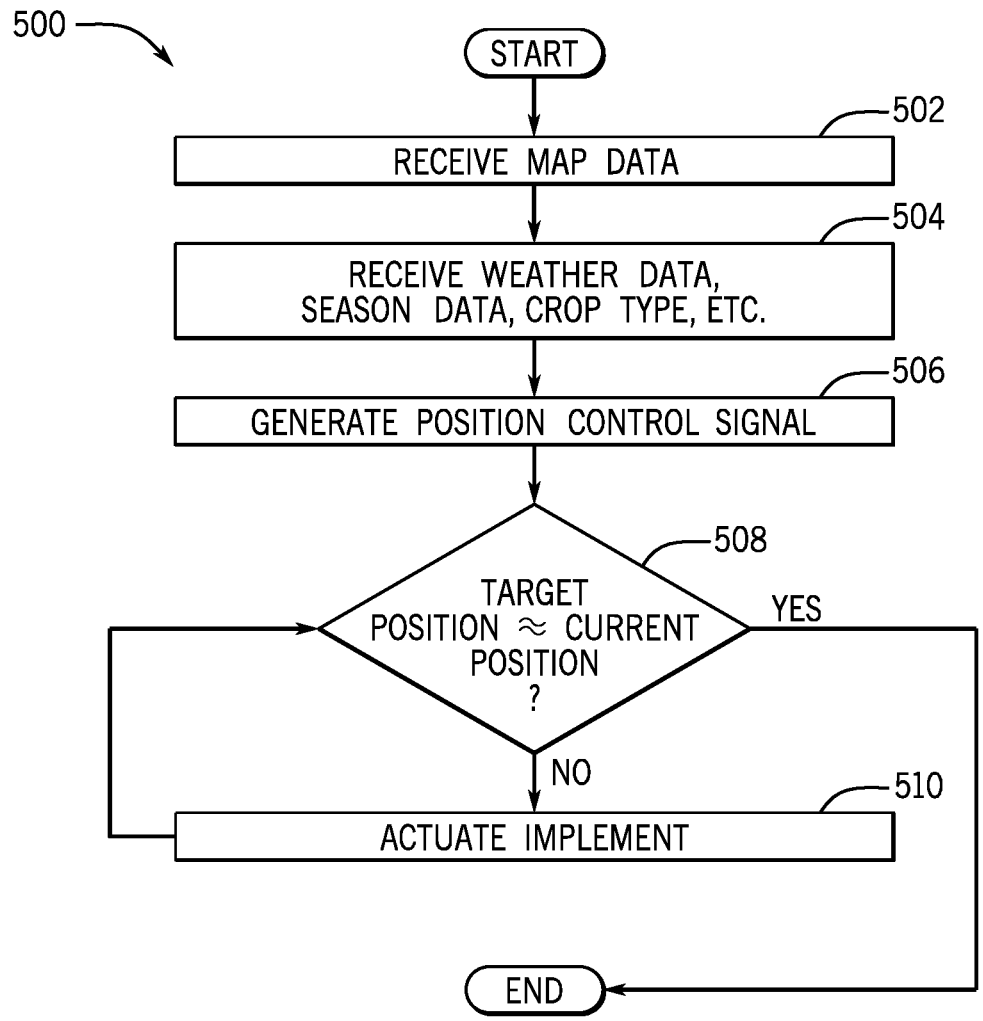
FIG. 11 is a flowchart illustrating a method of operating the work vehicle according to additional embodiments.

The map file may be stored within the memory element 350 and may be accessed when performing subsequent windrowing operations as illustrated, for example, in FIG. 11. The method 500 may begin at 502, wherein the processor 202 may receive the map data from the memory element 350. The map data may be part of the map file generated using the method 400 of FIG. 10. With this map data, the processor 202 may determine how to position and move the second conditioner roller 150, how to adjust the biasing member 154, how to move the swath flap 162, and/or how to position the forming shields 167 for particular locations within the field 300. Then, at 504 of the method 500, the processor 202 may receive weather data (e.g., the current weather and/or the weather forecast) from the weather station 354. Also, the processor 202 may receive a user input indicating the type of crop being windrowed.

Next, at 506, the processor 202 may generate control signals for moving the second conditioner roller 150, for adjusting the biasing member 154, for moving the swath flap 162, and/or for moving the forming shields 167. In some embodiments, the GPS 358 may indicate the current location of the windrower 100 within the field as it moves through the field 300, and the processor 202 may generate the control signal(s) based on this current location. In other words, the implements may be moved (returned) to the positions indicated and stored in the map file. In other embodiments, the processor 202 may adjust these positions, for example, based on the weather data, the crop type, the time of season, and/or other conditions.

At 508, the sensors of the sensor system 184 may detect the current position of the implements and compare the current position to the target positions indicated at 506. If the target position is not substantially equal to the current position, the position control signals generated at 506 may be sent to the actuators of the actuator system 174. Then, the method 500 may loop back to 508. The method 500 may loop between 508 and 510 until the target positions of the implements are approximately equal to the current positions. Then, the method 500 may terminate.

In some embodiments, the method 500 (or variations thereof) may be employed on-the-fly as the tractor 102 moves through the field 300. As the tractor 102 moves into a particular location within the field, the processor 202 may determine where to position the implements for that particular location by accessing the map data in the memory element 350. In some embodiments, as the tractor 102 approaches that particular location, the user interface 360 may query the operator whether to move the implements as determined. For example, the user interface 360 may output an audio or visual query message. The message may state that the tractor 102 is approaching a location in the field where the implements have an associated preset position, and the message may query the user whether to move the implements to the preset position. The user may decline the repositioning request and instead choose to retain control of the implement positions (i.e., manual override). Alternatively, the user may accept the request to reposition the implements; accordingly, as the tractor 102 approaches that particular location, the controller 200 may automatically re-position the implements. In additional embodiments, the controller 200 may automatically move the implements to the preset positions according to the map data without querying the operator.

Furthermore, in some embodiments, the system may automatically update a preset. For example, the operator may initially select (with the user interface 360) a stored preset for the second conditioner roller 150, the biasing member 154, the swath flap 162, and/or the forming shields 167 for a harvesting/windrowing operation in a particular location within the field. The initially-selected preset may be referred to as a "baseline preset." The operator may subsequently re-position the implement "manually" using the user interface 360 (e.g., because of the current conditions of the crop material). The system may detect this adjustment and, in some embodiments, the user interface 360 may query the operator whether to update the baseline preset. The system may save the updated preset if the operator so chooses. The presets may be updated repeatedly in some embodiments. Accordingly, the system may learn and update the settings to ensure optimal performance.

It will be appreciated that the operations of multiple components of the windrower 100 may be coordinated according to the method 500 of FIG. 11. For example, in some embodiments, the second conditioner roller 150 may be positioned, the biasing force of the biasing member 154 may be adjusted, the swath flap 162 may be positioned, and/or the forming shield 167 may be positioned according to the method 500 in a coordinated manner. Furthermore, the ground speed of the tractor 102, the position of the frame 122 relative to the tractor 102, and/or other components may be controlled according to the method 500 of FIG. 11.

Furthermore, it will be appreciated that the windrowers 100 of multiple tractors 102 within the fleet 320 may be coordinated and controlled simultaneously using the method 500 of FIG. 11. In some embodiments, for example, the controller 200 may be a remote controller that operates the tractors 102 within the fleet 320 individually. Accordingly, the harvesting operations may be performed in an efficient and convenient manner.

Additionally, in some embodiments, it may be necessary to calibrate features of the present disclosure. In the case of the conditioning arrangement 146, for example, the operator may move the second conditioner roller 150 through a full stroke relative to the first conditioner roller 148 to establish a range of movement. The sensors of the sensor system 184 may be used to detect the position of the second conditioner roller 150 as it is moved through this stroke. Additionally, in some embodiments, there may be a sensor (e.g., a vibration sensor) that detects when the first and second conditioner rollers 148, 150 are in contact and when the first a second conditioner rollers 148, 150 are spaced apart. In some embodiments, the user interface 360 may include a control that the operator may manipulate to initiate the calibration process. Accordingly, calibration of the implements may be accomplished efficiently.

Figure 12:
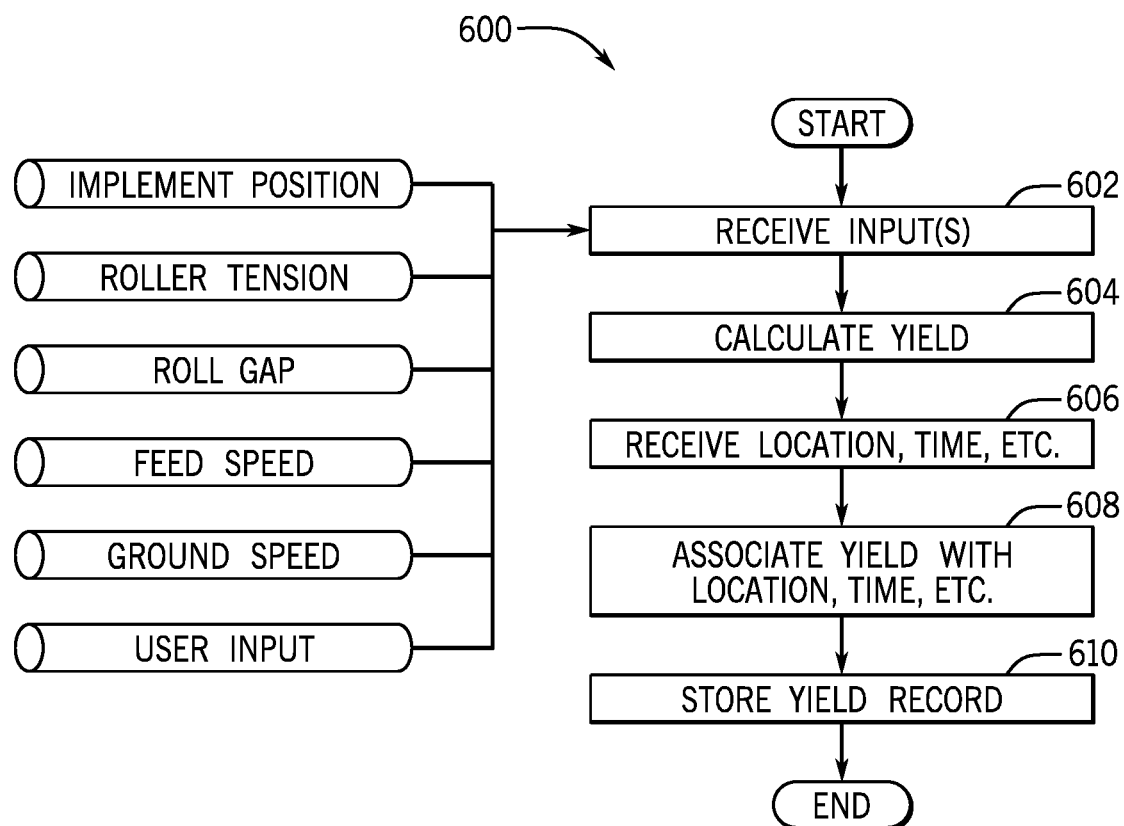
FIG. 12 is a flowchart illustrating a method of operating the work vehicle to measure yield according to additional embodiments.

Also, the systems and methods of the present disclosure may be employed for measuring yield of the crop material 136. For example, as shown in FIG. 12, a method 600 is illustrated for measuring yield. The method 600 may begin at 602, wherein the processor 202 receives one or more inputs. In some embodiments, the position of the second conditioner roller 150 may be detected by the sensor 185, and a corresponding signal may be provided to the processor 202. Moreover, the sensor 185 may dynamically detect the dimension of the gap 152 between the conditioner rollers 148, 150. Also, the sensor 187 may detect the biasing force provided by the biasing member 154, and a corresponding signal may be provided to the processor 202. Additionally, the sensor 192 may detect the current speed (i.e., "feed speed") of the conveyor arrangement 144, the ground speed of the tractor 102, and/or a user input. In some embodiments the user input may be the type of crop material.

Next, at 604, the processor 202 may calculate the yield based on the inputs received at 602. In some embodiments, the processor 202 may include one or more algorithms that calculate yield based on the inputs received at 602 of the method 600. In some embodiments, the processor 202 may determine "crop flow" using the algorithm and the detected ground speed may factor in to determine both if the windrower 100 is harvesting and from where the crop is being harvested.

Subsequently at 606, the processor 202 may receive the current location from the GPS 358, time data from the clock device 356, and the weather conditions from the weather station 354. The method 600 may continue at 608, wherein the yield calculated at 604 is associated with the location, time, or other information received at 606. Accordingly, the yield for particular locations within the field 300 may be recorded for future reference. Also, the method 600 may continue at 610, wherein the yield recorded at 608 is stored in the memory element 350.

This yield data may be determined and utilized in various ways. For example, the yield data may be stored in the memory element 350. Then, during subsequent windrowing operations, the roller gap 152 may be adjusted automatically according to the yield data. For example, the roller gap 152 may be reduced for areas that produced less yield during the previous harvesting. In contrast, the roller gap 152 may be increased for areas that produced more yield during the previous harvesting.

Accordingly, the systems and methods of the present disclosure may allow harvesting operations to be performed conveniently and efficiently. The settings for the conditioning arrangement 146, the swath flap 162, and/or the forming shields 167 may be adjusted accurately, precisely, and in a repeatable fashion. Moreover, in some embodiments, the swath flap 162 and the forming shields 167 may be controlled to control the width, density, placement, and/or other characteristics of the windrows.

The settings of these implements may be associated with particular areas of the field in a map file stored in the memory element 350. Therefore, the conditioning arrangement 146, the swath flap 162, and the forming shields 167 may be positioned and adjusted according to the current location (e.g., as detected by the GPS 358) for highly effective harvesting operations. The same field may be harvested multiple times per season; therefore, these operations may be very convenient for the operator. Moreover, characteristics of the crop material and/or the terrain may vary across the field, causing the operator to make manual adjustments to the settings. The system may record these adjustments. Then, during a subsequent harvesting/windrowing operation, the system may automatically adjust the settings according to the stored presets. Similarly, the windrower 100 may travel through multiple fields of different crop materials during a single harvesting/windrowing operation, and the operator may manually adjust the settings when traveling from one field to the next. The system may record the adjustments and automatically adjust the settings according to the stored presets during subsequent harvesting windrowing operations at the same fields.

Also, the settings of these implements may be adjusted, for example, based on the time of season (e.g., as detected by the clock device 356). For example, the first harvest of the season may have higher density yield; therefore, the roller gap 152 may be increased and/or the swath flap 162 may be lowered to produce a wider windrow. In contrast, subsequent harvests may have lower density yield; therefore, the roller gap 152 may be decreased and/or the swath flap 162 may be raised to allow the forming shields 167 to produce a narrower windrow.

Moreover, valuable information may be collected as the harvesting operation is being performed. For example, using the sensor system 184, the processor 202 may create an electronic record of wetter areas within the field of crop material 136. Accordingly, when these areas are subsequently harvested, the conditioning and/or windrowing arrangements 146, 156, 158 may be adjusted. For example, the arrangements may be adjusted such that the windrow is spread wider for faster and more complete drying. Likewise, upon reaching an area with a large amount of weeds, the operator may adjust the settings, for example, to change the windrow shape. Then the operator may enter a command to automatically return the conditioning arrangement 146 and/or the windrowing arrangements 156, 158 to the previous positions.

Also, the following examples are provided, which are numbered for easier reference.

1. A method of operating a conditioning arrangement for a harvesting work vehicle, the conditioning arrangement includes a conditioning roller and an opposing member that are configured to cooperatively condition a crop material that passes through a gap between the conditioning roller and the opposing member, the method comprising: receiving, by a processor of a control system from a memory element, a stored conditioning setting for the conditioning roller; processing, by the processor, a conditioning control signal based, at least in part, on the stored conditioning setting; and changing, with an actuator, a variable parameter of the conditioning roller according to the conditioning control signal.

2. The method of example 1, wherein the variable parameter is a dimension of the gap defined between the conditioning roller and the opposing member; and wherein changing the variable parameter includes actuating the conditioning roller relative to the opposing member to vary a dimension of the gap.

3. The method of example 1, wherein the conditioning roller is supported for movement relative to the opposing member between a neutral position and a displaced position to vary a dimension of the gap; wherein the conditioning arrangement further includes a biasing member; wherein the biasing member provides a biasing force that biases the conditioning roller toward the neutral position; wherein changing the variable parameter includes changing the biasing force provided by the biasing member.

4. The method of example 1, further comprising: detecting, with a sensor, an actual conditioning setting for the conditioning roller; and saving, within the memory element, the detected actual conditioning setting as the stored conditioning setting.

5. The method of example 4, wherein detecting the actual conditioning setting occurs during a first harvesting operation within a field; and wherein receiving the stored conditioning setting, processing the conditioning control signal, and changing the variable parameter occur during a second harvesting operation within the field, the second harvesting operation being subsequent to the first harvesting operation.

6. The method of example 4, further comprising receiving, by the processor, location data that corresponds to an actual location of the harvesting work vehicle within a field; and wherein processing the conditioning control signal includes processing the conditioning control signal based, at least in part, on the stored conditioning setting and the location data.

7. The method of example 6, further comprising performing a first harvesting operation in the field with the harvesting work vehicle and performing a second harvesting operation in the field with the harvesting work vehicle; wherein performing the first harvesting operation includes: detecting the actual conditioning setting for the conditioning roller; detecting an actual location of the harvesting work vehicle within the field where the variable parameter is at the actual conditioning setting; saving, within the memory element, the actual conditioning setting as the stored conditioning setting with the detected actual location associated therewith; and wherein performing the second harvesting operation includes: receiving the stored conditioning setting and the associated actual location; determining, by the processor, that the second harvesting operation includes return travel to the actual location; processing the conditioning control signal based, at least in part, on the stored conditioning setting and the associated actual location; and changing the variable parameter of the conditioning roller according to the conditioning control signal.

8. The method of example 4, further comprising receiving, by the processor, crop data that corresponds to a characteristic of the crop material that is harvested with the conditioning roller at the actual conditioning setting; wherein processing the conditioning control signal includes processing the conditioning control signal based, at least in part, on the stored conditioning setting and the crop data.

9. The method of example 1, further comprising outputting, via a user interface, a user message concerning the stored conditioning setting.

10. The method of example 9, wherein the user message is a user query whether to change the variable parameter according to the stored conditioning setting; and wherein changing the variable parameter occurs as a result of a user confirmation to change the variable parameter conditioning arrangement according to the stored conditioning setting.

11. A harvesting work vehicle comprising: a conditioning arrangement that is configured to condition a crop material, the conditioning arrangement includes a conditioning roller and an opposing member that are configured to cooperatively condition a crop material that passes through a gap between the conditioning roller and the opposing member; a control system with a processor and a memory element; and an actuator configured to actuate to change a variable parameter of the conditioning roller; the processor being configured to receive, from the memory element, a stored conditioning setting for the variable parameter of the conditioning roller; the processor being configured to process a conditioning control signal based, at least in part, on the stored conditioning setting; and the actuator configured to actuate to change the variable parameter according to the conditioning control signal.

12. The harvesting work vehicle of example 11, wherein the variable parameter is a dimension of the gap defined between the conditioning roller and the opposing member; and wherein the actuator is configured to actuate to vary the dimension of the gap.

13. The harvesting work vehicle of example 11, wherein the conditioning arrangement further comprises a biasing member; wherein the conditioning roller is supported for movement relative to the opposing member between a neutral position and a displaced position to vary a dimension of the gap; wherein the biasing member provides a biasing force that biases the conditioning roller toward the neutral position; and wherein the actuator is configured to actuate to change the biasing force provided by the biasing member.

14. The harvesting work vehicle of example 11, further comprising a sensor that is configured to detect an actual conditioning setting for the conditioning roller; and wherein the memory element is configured to store the detected actual conditioning setting as the stored conditioning setting.

15. The harvesting work vehicle of example 14, further comprising a location sensor that is configured to detect an actual location of the harvesting work vehicle within a field; wherein the memory element is configured to save actual location data that corresponds to the actual location detected by the location sensor; wherein the processor is configured to associate within the memory element, the actual location data with the stored conditioning setting; and wherein the processor is configured to process the conditioning control signal based, at least in part, on the stored conditioning setting and the associated actual location data.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of operating a conditioning arrangement for a harvesting work vehicle, the conditioning arrangement including a conditioning roller and an opposing member that are configured to cooperatively condition a crop material that passes through a gap between the conditioning roller and the opposing member, the method comprising:
   during a first harvesting operation within a field:
      detecting, with a sensor, an actual conditioning setting for a variable parameter of the conditioning roller; and
      saving, within a memory element of a control system having a processor, the detected actual conditioning setting as a stored conditioning setting for the conditioning roller; and
   during a second harvesting operation within the field subsequent to the first harvesting operation:
      receiving, by the processor the stored conditioning setting;
      processing, by the processor, a conditioning control signal based, at least in part, on the stored conditioning setting; and
      changing, with an actuator, the variable parameter of the conditioning roller according to the conditioning control signal.

2. The method of claim 1, wherein the variable parameter is a dimension of the gap defined between the conditioning roller and the opposing member; and
   wherein changing the variable parameter includes actuating the conditioning roller relative to the opposing member to vary the dimension of the gap.

3. The method of claim 1, wherein the conditioning roller is supported for movement relative to the opposing member between a neutral position and a displaced position to vary a dimension of the gap;
   wherein the conditioning arrangement further includes a biasing member that provides a biasing force to bias the conditioning roller toward the neutral position; and
   wherein changing the variable parameter includes changing the biasing force provided by the biasing member.

4. The method of claim 1, further comprising receiving, by the processor, location data that corresponds to an actual location of the harvesting work vehicle within a field; and
   wherein processing the conditioning control signal includes processing the conditioning control signal based, at least in part, on the stored conditioning setting and the location data.

5. The method of claim 4, further comprising:
   during the first harvesting operation:
      detecting an actual location of the harvesting work vehicle within the field where the variable parameter is at the actual conditioning setting; and
      saving, within the memory element, the actual conditioning setting as the stored conditioning setting with the detected actual location associated therewith; and
   during the second harvesting operation:
      determining, by the processor, that the second harvesting operation includes return travel to the actual location; and
      processing the conditioning control signal based, at least in part, on the stored conditioning setting and the associated actual location.

6. The method of claim 1, further comprising receiving, by the processor, weather data; and
   wherein processing the conditioning control signal includes processing the conditioning control signal based, at least in part, on the stored conditioning setting and the weather data.

7. The method of claim 1, further comprising receiving, by the processor, crop data that corresponds to a characteristic of the crop material that is harvested with the conditioning roller at the actual conditioning setting;
   wherein processing the conditioning control signal includes processing the conditioning control signal based, at least in part, on the stored conditioning setting and the crop data.

8. The method of claim 1, further comprising outputting, via a user interface, a user message concerning the stored conditioning setting.

9. The method of claim 8, wherein the user message is a user query whether to change the variable parameter according to the stored conditioning setting; and wherein changing the variable parameter occurs as a result of a user confirmation to change the variable parameter according to the stored conditioning setting.

10. A harvesting work vehicle comprising:
a conditioning arrangement that is configured to condition a crop material, the conditioning arrangement including a conditioning roller and an opposing member that are configured to cooperatively condition a crop material that passes through a gap between the conditioning roller and the opposing member;
a control system with a processor and a memory element;
a sensor configured to detect an actual conditioning setting for a variable parameter of the conditioning roller during a first harvesting operation within a field; and
an actuator configured to actuate to change the variable parameter of the conditioning roller;
the memory element being configured to store, during the first harvesting operation within the field, the detected actual conditioning setting as a stored conditioning setting;
the processor being configured to receive from the memory element, during a second harvesting operation within the field subsequent to the first harvesting operation, the stored conditioning setting;
the processor being configured to process a conditioning control signal based, at least in part, on the stored conditioning setting; and
the actuator configured to actuate to change the variable parameter according to the conditioning control signal.

11. The harvesting work vehicle of claim 10, wherein the variable parameter is a dimension of the gap defined between the conditioning roller and the opposing member;
wherein the actuator is configured to actuate to vary the dimension of the gap.

12. The harvesting work vehicle of claim 10, wherein the conditioning arrangement further comprises a biasing member;
wherein the conditioning roller is supported for movement relative to the opposing member between a neutral position and a displaced position to vary a dimension of the gap;
wherein the biasing member provides a biasing force that biases the conditioning roller toward the neutral position; and
wherein the actuator is configured to actuate to change the biasing force provided by the biasing member.

13. The harvesting work vehicle of claim 10, further comprising a location sensor that is configured to detect an actual location of the harvesting work vehicle within a field;
wherein the memory element is configured to save actual location data that corresponds to the actual location detected by the location sensor;
wherein the processor is configured to associate within the memory element, the actual location data with the stored conditioning setting; and
wherein the processor is configured to process the conditioning control signal based, at least in part, on the stored conditioning setting and the associated actual location data.

14. The harvesting work vehicle of claim 13, wherein the location sensor is in communication with a global positioning system for detecting an actual geolocation of the harvesting work vehicle.

15. The harvesting work vehicle of claim 10, wherein the processor includes a weather module configured to receive weather data; and
wherein the processor is configured to process the conditioning control signal based, at least in part, on the stored conditioning setting and the weather data.

16. The harvesting work vehicle of claim 10, wherein the processor is configured to receive crop data that corresponds to a characteristic of the crop material that is harvested with the variable parameter at the actual conditioning setting; and
wherein the processor is configured to process the conditioning control signal based, at least in part, on the stored conditioning setting and the crop type data.

17. A method of operating a harvesting work vehicle with a conditioning arrangement, the conditioning arrangement including a first conditioning roller and a second conditioning roller that are separated by a gap, the first conditioning roller supported for movement relative to the second conditioning roller between a neutral position and a displaced position, the conditioning arrangement configured to receive a crop material within the gap to be conditioned between the first and second conditioning rollers, the conditioning arrangement including a biasing member that biases the first conditioning roller toward the neutral position, the method comprising:
performing a first harvesting operation in a field with the harvesting work vehicle, including:
detecting, with at least one conditioning sensor, an actual gap setting corresponding to a dimension of the gap at the neutral position;
detecting, with the at least one conditioning sensor, an actual bias setting corresponding to an amount of biasing force provided by the biasing member;
detecting, with a location sensor, a location within the field at which the conditioning arrangement is set at the actual gap setting and the actual bias setting; and
saving, within a memory element, the actual gap setting and the actual bias setting as a stored conditioning setting that is associated with the location; and
performing a second harvesting operation in the field with the harvesting work vehicle, including:
determining that the second harvesting operation includes return travel to the location;
receiving, by a processor from the memory element, the stored conditioning setting associated with the location;
processing, by the processor, a conditioning control signal based on the stored conditioning setting;
changing, with a first actuator, the dimension of the gap at the neutral position according to the stored conditioning setting; and
changing, with a second actuator, the amount of biasing force according to the stored conditioning setting.

* * * * *